United States Patent
Gill et al.

(10) Patent No.: US 11,178,394 B2
(45) Date of Patent: Nov. 16, 2021

(54) SYSTEM AND METHOD OF SUBJECTIVE VIDEO QUALITY EVALUATION

(71) Applicant: Beamr Imaging Ltd, Tel-Aviv (IL)

(72) Inventors: Dror Gill, Haifa (IL); Tamar Shoham, Netanya (IL); Dan Julius, Giva'at Ada (IL); Dafna Assaf, Ramat-Gan (IL)

(73) Assignee: BEAMR IMAGING LTD, Tel-Aviv (IL)

( * ) Notice: Subject to any disclaimer, the term of this patent is extended or adjusted under 35 U.S.C. 154(b) by 0 days.

(21) Appl. No.: 16/880,646

(22) Filed: May 21, 2020

(65) Prior Publication Data

US 2021/0021805 A1 Jan. 21, 2021

Related U.S. Application Data

(60) Provisional application No. 62/874,522, filed on Jul. 16, 2019.

(51) Int. Cl.
*H04N 17/00* (2006.01)
*H04N 17/02* (2006.01)
*H04N 21/658* (2011.01)
*H04B 17/309* (2015.01)

(52) U.S. Cl.
CPC ......... *H04N 17/004* (2013.01); *H04B 17/309* (2015.01); *H04N 21/6582* (2013.01)

(58) Field of Classification Search
CPC ...... H04N 17/00; H04N 17/02; H04N 17/004; H04N 21/6582; H04N 5/50; H04B 17/309
USPC ........................................ 348/180, 184, 192
See application file for complete search history.

(56) References Cited

U.S. PATENT DOCUMENTS

| | | | | |
|---|---|---|---|---|
| 7,683,931 B2* | 3/2010 | Pirzada | ................ | H04N 17/02 348/192 |
| 8,654,181 B2* | 2/2014 | Cornog | ................ | H04N 13/183 348/47 |
| 8,817,110 B1* | 8/2014 | Biagiotti | ................ | H04N 17/04 348/181 |
| 8,917,777 B2* | 12/2014 | Xie | ................ | H04N 19/109 375/240.27 |
| 9,064,154 B2* | 6/2015 | Kocks | ................ | H04N 21/4826 |

(Continued)

OTHER PUBLICATIONS

Crowd-sourced subjective quality evaluation platform, www.subjectify.us, Jun. 30, 2019, pp. 1-6.

(Continued)

*Primary Examiner* — Trang U Tran
(74) *Attorney, Agent, or Firm* — Browdy and Neimark, PLLC

(57) ABSTRACT

There are provided computerized systems and methods for video quality assessment, the system including a server including a database configured to store pointers to a plurality of video clip pairs and a processor operatively connected thereto, configured to store pointers to a plurality of video clip pairs to be used in one or more test sessions performed by one or more users. The processor is configured to create, for each test session performed by a respective user: a test set, a display order and display positions of the each video in each video clip pairs in the set, and is further configured to send the one or more test sets to the one or more users for assessing quality and to receive feedback regarding the assessed quality, wherein the feedback is usable for providing subjective quality evaluation of the plurality of video clip pairs.

17 Claims, 13 Drawing Sheets

(56) References Cited

U.S. PATENT DOCUMENTS

| | | | | |
|---|---|---|---|---|
| 9,319,670 | B2* | 4/2016 | Sun | H04N 17/004 |
| 2010/0053300 | A1* | 3/2010 | Einarsson | H04M 3/2236 |
| | | | | 348/14.01 |

OTHER PUBLICATIONS

Marr, "How Much Data Do We Create Every Day? The Mind-Blowing Stats Everyone Should Read", https://www.forbes.com/sites/bernardmarr/2018/05/21/how-much-data-do-we-create-every-day-the-mind-blowing-stats-everyone-should-read, May 21, 2018.

Wang, Zhou, et al. "Image quality assessment: from error visibility to structural similarity." IEEE transactions on image processing 13.4 (Apr. 2004): 600-612.

Sheikh, Hamid; Bovik, Alan. "Image Information and Visual Quality". IEEE Transactions on Image Processing. 15 (2): 430-444.

Zhi Li, Anne Aaron et al., "Toward A Practical Perceptual Video Quality Metric," Netflix TechBlog, Jun. 2016.

Tamar Shoham, Dror Gill, Sharon Carmel, "A novel perceptual image quality measure for block based image compression," Proc SPIE 7867, Image Quality and System Performance VIII, 786709, 2011.

R. Rassool, "VMAF reproducibility: Validating a perceptual practical video quality metric," 2017 IEEE International Symposium on Broadband Multimedia Systems and Broadcasting (BMSB), Cagliari, 2017.

Recommendation ITU-R BT.500-13, "Methodology for the subjective assessment of the quality of television pictures", 2012.

Recommendation ITU-R BT.710-4, "Subjective Assessment Methods for Image Quality in High-Definition Television", 1990-1998.

Report ITU-R BT.1082-1, "Studies Towards the Unification of Picture Assessment Methodologies", 1986-1990.

Rafal K. Mantiuk, Anna Tomaszewska, and Radoslaw Mantiuk, "Comparison of Four Subjective Methods for Image Quality Assessment", Computer Graphics Forum Dec. 31, 2012, pp. 2478-2491.

ITU-T p. 910 "Subjective video quality assessment methods for multimedia applications", 2008.

ITU-T p. 913, "Methods for the subjective assessment of video quality, audio quality and audiovisual quality of Internet video and distribution quality television in any environment", 2016.

"Beamr Riew Video Comparison Tool", https://beamr.com/h264-hevc-video-comparison-player/ (May 23, 2019).

"Amazon DynamoDB Fast and Flexible NoSQL database service for any scale", 14. https://aws.amazon.com/dynamodb/ (May 23, 2019).

"Amazon Mechanical Turk", https://www.mturk.com/ (Jul. 6, 2019).

"Beamr Optimizer", https://beamr.com/video-content-adaptive-optimizer (Oct. 30, 2018).

Binomial Distribution Confident Interval, www.wolframalpha.com/entities/calculators/binomial_distribution_confidence_interval/ (Jul. 6, 2019).

"Cisco Visual Networking Index: Forecast and Trends, 2017-2022 White Paper" https://www.cisco.com/c/en/us/solutions/collateral/service-provider/visual-networking-index-vni/white-paper-c11-741490.html (Feb. 27, 2019 ).

Shoham, T., Gill, D., Carmel, S., Terterov, N. and Tiktov, P., "Content-adaptive frame level rate control for video encoding using a perceptual video quality measure," Proc. SPIE 11137, Applications of Digital Image Processing XLII, Aug. 2019.

* cited by examiner

| sceneNum | S3videoPath | srcWidth | srcHeight | width | height | fps | numFrames | startOffset | inFormat | outFormat | bitrate |
|---|---|---|---|---|---|---|---|---|---|---|---|
| 1 | s3://beamr_content/clip1.mkv | 4096 | 1744 | 1024 | 436 | 24 | 240 | 00:00:20 | yuv420p | yuv420p | 655 |
| 2 | s3://beamr_content/clip2.avc | 4096 | 1744 | 2048 | 872 | 24 | 240 | 00:04:30 | yuv420p | yuv420p | 2977 |
| 3 | s3://beamr_content/clip2.avc | 4096 | 1744 | 3072 | 1308 | 24 | 240 | 00:03:20 | yuv420p | yuv420p | 7400 |
| 4 | s3://beamr_content/clip3.mp4 | 1920 | 1080 | 1280 | 720 | 24 | 240 | 00:01:25 | yuv420p | yuv420p | 1584 |
| 5 | s3://beamr_content/clip3.mp4 | 1920 | 1080 | 1440 | 810 | 24 | 240 | 00:02:15 | yuv420p | yuv420p | 2413 |
| 6 | s3://beamr_content/clip4.264 | 1920 | 1080 | 1920 | 1080 | 24 | 240 | 00:03:05 | yuv420p | yuv420p | 6041 |
| 7 | s3://beamr_content/clip4.264 | 1920 | 1080 | 1920 | 1080 | 23.98 | 240 | 00:02:30 | yuv420p | yuv420p | 7253 |
| 8 | s3://beamr_content/clip5.mov | 1920 | 1080 | 1920 | 1080 | 23.98 | 240 | 00:01:30 | yuv420p | yuv420p | 6283 |
| 9 | s3://beamr_content/clip5.mov | 1920 | 1080 | 1280 | 720 | 23.98 | 240 | 00:01:00 | yuv420p | yuv420p | 5907 |
| 10 | s3://beamr_content/clip5.mov | 1920 | 1080 | 1280 | 720 | 23.98 | 240 | 00:01:50 | yuv420p | yuv420p | 3342 |

Figure 7

| Video ID | Original | Degraded | Difficulty | # Plays | X0 | Y0 | X1 | Y1 | Width | Height | Duration | Target On | Selected | User |
|---|---|---|---|---|---|---|---|---|---|---|---|---|---|---|
| NSBitjBe | https://.../src/tst10.h264 | https://.../trgt/tst10_BRred_50.h2 | 5 | 2 | 975 | 203 | 1615 | 784 | 1920 | 800 | 10000 | right | right | xx@beamr.com |
| ovAjqDAG | https://.../src/tst5.h264 | https://.../trgt/tst5_crf_40.h264 | 0 | 1 | 53 | 14 | 693 | 595 | 1280 | 720 | 10219 | right | right | xx@beamr.com |
| VFMCMoF8 | https://.../src/tst3.h264 | https://.../trgt/tst3_balanced_high | 5 | 1 | 331 | 205 | 971 | 786 | 1920 | 1080 | 10010 | left | left | xx@beamr.com |
| aWxtUHsY | https://.../src/tst7.h264 | https://.../trgt/tst7_crf_30.h264 | 10 | 3 | 99 | 49 | 739 | 630 | 1920 | 832 | 10417 | right | right | xx@beamr.com |
| o4kikSo8 | https://.../src/tst5.h264 | https://.../trgt/tst5_crf_28.h264 | 5 | 2 | 103 | 138 | 743 | 719 | 1280 | 720 | 10219 | right | right | xx@beamr.com |
| XmPqBaGx | https://.../src/tst16.h264 | https://.../trgt/tst16_BRred_40.h264 | 0 | 1 | 988 | 90 | 1628 | 671 | 1920 | 1080 | 9642 | left | left | xx@beamr.com |
| F3pfav8W | https://.../src/tst8.h264 | https://.../trgt/tst8_BRred_50.h264 | 5 | 2 | 295 | 0 | 935 | 544 | 1280 | 544 | 10417 | right | right | xx@beamr.com |
| oUVRsekC | https://.../src/tst3.h264 | https://.../trgt/tst3_crf_28.h264 | 5 | 3 | 1272 | 351 | 1912 | 932 | 1920 | 1080 | 10010 | right | right | xx@beamr.com |
| mNVKmJB | https://.../src/tst4.h264 | https://.../trgt/tst4_crf_28.h264 | 5 | 1 | 492 | 135 | 1132 | 716 | 1280 | 720 | 10219 | left | left | xx@beamr.com |
| F2W9f2Xe | https://.../src/tst3.h264 | https://.../trgt/tst3_mini.h264 | 10 | 2 | 1256 | 431 | 1896 | 1012 | 1920 | 1080 | 10010 | right | right | xx@beamr.com |
| FKV2tKRz | https://.../src/tst11.h264 | https://.../trgt/tst11_mini.h264 | 5 | 1 | 1267 | 53 | 1907 | 634 | 1920 | 800 | 10000 | right | left | xx@beamr.com |
| gPFz61s7 | https://.../src/tst15.h264 | https://.../trgt/tst15_crf_40.h264 | 0 | 1 | 718 | 298 | 1358 | 879 | 1920 | 1080 | 9642 | left | left | xx@beamr.com |
| Qzbytit | https://.../src/tst13.h264 | https://.../trgt/tst13_crf_28.h264 | 5 | 1 | 539 | 17 | 1179 | 598 | 1280 | 720 | 9642 | right | right | xx@beamr.com |
| skraSIZy | https://.../src/tst2.h264 | https://.../trgt/tst2_BRred_70.h264 | 5 | 2 | 198 | 158 | 838 | 739 | 1920 | 1080 | 10427 | left | left | xx@beamr.com |
| tpBkBGMq | https://.../src/tst10.h264 | https://.../trgt/tst10_crf_28.h264 | 5 | 3 | 817 | 194 | 1457 | 775 | 1920 | 800 | 10000 | right | right | xx@beamr.com |
| fzafoqfti | https://.../src/tst9.h264 | https://.../trgt/tst9_mini.h264 | 5 | 2 | 207 | 0 | 847 | 544 | 1280 | 544 | 10417 | right | right | xx@beamr.com |
| rVFKajgy | https://.../src/tst4.h264 | https://.../trgt/tst4_mini.h264 | 5 | 2 | 32 | 120 | 672 | 701 | 1280 | 720 | 10219 | right | right | xx@beamr.com |
| WcNadEqh | https://.../src/tst14.h264 | https://.../trgt/tst14_crf_40.h264 | 0 | 2 | 369 | 10 | 1009 | 591 | 1280 | 720 | 9642 | left | left | xx@beamr.com |
| v6yALvSU | https://.../src/tst1.h264 | https://.../trgt/tst1_crf_30.h264 | 5 | 3 | 254 | 170 | 894 | 751 | 1920 | 1080 | 10427 | right | right | xx@beamr.com |
| QnTGs9zz | https://.../src/tst9.h264 | https://.../trgt/tst9_crf_34.h264 | 5 | 3 | 458 | 0 | 1098 | 544 | 1280 | 544 | 10417 | right | right | xx@beamr.com |

Figure 8

SYSTEM AND METHOD OF SUBJECTIVE VIDEO QUALITY EVALUATION

TECHNICAL FIELD

The presently disclosed subject matter relates generally to the field of assessment of video quality, and more specifically, to methods and systems of assessment of subjective quality of video content.

BACKGROUND

The growth in video broadcasting and consumption in the past decade has surpassed even the most optimistic predictions, and projections are for significant further growth of this industry in the upcoming years. According to market research, in May 2018, every minute of every day users worldwide were watching 4,146,600 YouTube videos. As consumers of video content are still primarily humans, maintaining high subjective quality of provided video is paramount to the success of video-based services and applications.

For all video, viewed in any context, the goal is to minimize costs while maximizing visual quality. The costs are composed of both the computational resources and power consumption required to perform all processing, from content acquisition, whether on camera or synthetically generated, and up until content consumption, as well as the obtained video file size or bitrate which impacts the cost of storage and required transmission bandwidth. Many complimenting approaches are taken to reduce costs: development of new encoding schemes and standards, optimizing encoders to reduce power consumption, creating more efficient storage and transmission platforms etc. The counter challenge—maximizing visual quality, makes subjective video quality assessment a necessity, requiring availability of a fast, reliable and robust subjective quality evaluation process. This need is answered by the system described herein.

A commonly used approach to evaluating video quality is by calculating objective quality metrics. The main advantages of this approach are the low cost of procuring the quality assessments and the repeatability of the results. When a comparison is performed by different researchers or companies using objective metrics, the numerical results will be completely consistent. Objective metrics belong to different categories according to their reliance on a reference or original video, to which the target video is compared. In this paper we limit the discussion to full-reference metrics, i.e. assessing quality of a particular video stream or video clip when compared to a corresponding reference or source video stream or clip. The full reference quality metrics vary from the most simple such as Peak-Signal-to-Noise-Ratio, which is just a logarithmically scaled Mean-Square-Error, through metrics such as Structural-SIMilarity (SSIM) and Visual Information Fidelity (VIF) and up to sophisticated metrics that have been shown to offer higher correlation with subjective quality such as Netflix's video quality assessment based on multi-method fusion known as VMAF.

While objective metrics are an invaluable tool, and they do provide an estimate of perceived quality, they cannot always reliably indicate the subjective quality. This is definitely true for the simple metrics such as PSNR, but holds even for the more sophisticated metrics, which still cannot truly capture the subjective opinion across a multitude of possible artifact types and extremity. This conclusion has been confirmed in wide testing rounds which found lack of correlation in VMAF results for specific artifact types or artifact ranges.

This raises the need for subjective video quality assessment, which has caused the ITU to offer some subjective video quality assessment standards. This was performed due to the understanding that defining common scales or criteria for measuring visual quality of video content greatly benefits the video industry and led to several attempts to standardize the process of visual quality assessment of video.

The most commonly used standard for performing subjective testing of visual quality is ITU-R BT.500. This ITU recommendation describes standardized methods for subjective quality testing of television pictures, and defines the following test features: General viewing conditions such as display luminance and brightness, maximum observation angle, background chromaticity, room illumination, monitor resolution, monitor contrast and preferred viewing distance, source signals, selection of test materials and observers, test duration, instructions, order of test material and finally, how to present the test results. ITU-R BT.710 is a short document that further describes some viewing conditions and assessment methods which are specific to High Definition TV.

BT.500 sets forth five different test methods, and points to ITU-R BT.1082 for the definition of five additional test methods. One of these is the Double-Stimulus Impairment Scale (DSIS) method, where the observer views an original clip followed by a processed clip and is asked grade the impairment of the processed clip relative to the original clip on a discrete scale ranging from "imperceptible" to "very annoying". Another method presented is the double-stimulus continuous quality-scale (DSCQS), in which the observer is asked to assess the quality of both clips in the pair.

BT.1082 is not a normative document, but describes studies related to the development of new methods for subjective quality testing. Once these studies are finalized, candidate methods may be proposed for inclusion in future versions of BT.500. One of the proposed testing methods is the Forced-Choice Double-Stimulus (FCDS) method which has been specifically designed for assessing thresholds of visibility. This method is similar to DSIS and DSCQS tests, in that the observer views a pair of clips, e.g. original and processed, in random order, but instead of marking the quality the observer is simply asked which of them is impaired. The choice is described as forced since the observer must always select one of the clips, even if they seem identical. In studies comparing subjective methods for image quality assessment the forced-choice pairwise comparison method was found to produce the most accurate results.

Note that while it is common to apply the above test procedures to video clips, many of them were originally defined for TV pictures. ITU-T P.910 describes non-interactive subjective assessment methods for evaluating the one-way overall video quality for multimedia applications and is beneficial in adapting the testing procedures defined in the previous standards and recommendations to more dynamic testing content. ITU-T P.913 recommendation describes methods for the subjective assessment of video quality, audio quality and audiovisual quality of Internet video and distribution quality television in any environment, enabling evaluation of video quality on multiple devices in various "real-life" situations.

The limited reliability of assessing subjective video quality using objective metrics, and the high complexity and cost of using the standardized assessment approaches described above, were the reasons we found the need to invent the subjective evaluation system described herein. Our goal was to invent and develop a framework which would enable low cost, fast turnaround, and most importantly—reliable subjective quality assessment. The invention consists of two components: the client or application, and the backend or server. Each test session is performed by running a client, described below. This client communicates with the backend, or server, to receive test clips and upload the user feedback or test results. Once enough tests are performed, the results are collected from the backend and analyzed. We will now provide the details of these two components.

Note that the following groups of terms are used interchangeably in this description: {video files; video streams; video scenes; video content; video clips}, {backend; server} and {client; application; frontend}.

General Description

In accordance with certain aspects of the presently disclosed subject matter, there is provided a computerized system for video quality assessment, the system comprising: a server comprising a database and a processor operatively connected thereto, wherein the database is configured to store pointers to a plurality of video clip pairs to be used in one or more test sessions performed by one or more users, each video clip pair including a target video clip and a reference video clip corresponding thereto; and the processor is configured to: Create, for each test session performed by a respective user, a test set including a set of video clip pairs selected from the plurality of video clip pairs to be displayed to the respective user, a display order of the video clip pairs in the set and display positions of the target video clip and the reference video clip in each video clip pair on a display screen of the respective user, giving rise to one or more test sets corresponding to the one or more test sessions; Send the one or more test sets to the one or more users for assessing quality of the target video clip and the reference video clip in each video clip pair in one or more sets of video clip pairs in the one or more test sets; Receive feedback regarding the assessed quality from the one or more users, wherein the feedback is usable for providing subjective quality evaluation of the plurality of video clip pairs.

In addition to the above features, the system according to this aspect of the presently disclosed subject matter can comprise one or more of features (a) to (g) listed below, in any desired combination or permutation which is technically possible:

(a) A client unit operatively connected to the server, the client unit comprising an additional processor configured to perform a given test session by a given user, wherein the client unit is configured to: Receive said test set; Display the video clip pairs in the set according to the display order and the display positions in the test set, thereby enabling the given user to perform the given test session and assess quality of the target video clip and reference video clip in each video clip pair; Collect feedback regarding the assessed quality for each video clip pair and send the feedback to said server, wherein the feedback is usable for providing subjective quality evaluation of the plurality of video clip pairs.

(b) The set of video clip pairs includes one or more video clip pairs each with visible degradation in quality between the target video clip and the corresponding reference video clip, wherein the one or more video clip pairs are used for user validation.

(c) The set of video clip pairs include one or more video clip pairs used for statistical validation, wherein the target video clip and the reference video clip in each of the one or more video clip pairs are identical.

(d) The processor is further configured to select the set of video clips pairs from the database for each test set, so that each of the plurality of video clip pairs is included in a pre-determined number of the one or more test sets.

(e) The display positions of the target video clip and the reference video clip in each video clip pair are determined in a semi-randomized manner.

(f) The display order of the video clip pairs in the set is determined in a semi-randomized manner.

(g) The display order of the video clip pairs in the set is determined at least by inserting the one or more video clip pairs with visible degradation in one or more semi-randomized slots along the test set.

In accordance with yet other aspects of the presently disclosed subject matter, there is provided a computerized system for video quality assessment, the system comprising a processor configured to: Receive a test set including a set of video clip pairs selected from a plurality of video clip pairs to be displayed to a user, each video clip pair including a target video clip and a reference video clip, a display order of the video clip pairs in the set, and display positions of the target video clip and the reference video clip in each video clip pair on a display screen of the user; Display the video clip pairs in the set according to the display order and the display positions in the test set, thereby enabling the user to perform a test session and assess quality of the target video clip and the reference video clip in each video clip pair; and Collect feedback regarding the assessed quality for each video clip pair and send the feedback to a server, wherein the feedback is usable for providing subjective quality evaluation of the plurality of video clip pairs.

In addition to the above features, the system according to this aspect of the presently disclosed subject matter can comprise one or more of features (i) to (vi) listed below, in any desired combination or permutation which is technically possible:

(i) The processor is a client application or unit configured to perform said receiving, displaying, collecting and sending in a fully automated manner.

(ii) The set of video clip pairs include one or more video clip pairs each with visible degradation in quality between the target video clip and the corresponding reference video clip, wherein the one or more video clip pairs are used for user validation.

(iii) The set of video clip pairs include one or more video clip pairs used for statistical validation, wherein the target video clip and the reference video clip in each of the one or more video clip pairs are identical.

(iv) The display positions of the target video clip and the reference video clip in each video clip pair are determined in a semi-randomized manner (v) The display order of the video clip pairs in the set is determined in a semi-randomized manner.

(vi) The display order of the video clip pairs in the set is determined at least by inserting the one or more video clip pairs with visible degradation in one or more semi-randomized slots along the test set.

In accordance with yet other aspects of the presently disclosed subject matter, there is provided a computerized method for video quality assessment, the method comprising: Generating, by a processor in a server, one or more test sets corresponding to one or more test sessions performed by one or more users, comprising: Creating, for each test session performed by a respective user, a test set including a set of video clip pairs selected from a plurality of video clip pairs stored in a database to be displayed to the respective user, a display order of the video clip pairs in the set and display positions of a target video clip and a corresponding reference video clip included in each video clip pair on a display screen of the respective user, giving rise to the one or more test sets corresponding to the one or more test sessions; Sending, by the processor, the one or more test sets to the one or more users for assessing quality of the target video clip and the reference video clip in each video clip pair in one or more sets of video clip pairs in the one or more test sets; Receiving, by the processor, feedback regarding the assessed quality from the one or more users, wherein the feedback is usable for providing subjective quality evaluation of the plurality of video clip pairs.

This aspect of the disclosed subject matter can comprise one or more of features (a) to (g) listed above with respect to the system, mutatis mutandis, in any desired combination or permutation which is technically possible.

In accordance with yet further aspects of the presently disclosed subject matter, there is provided a computerized method for video quality assessment, the method comprising: Receiving, by a processor, a test set including a set of video clip pairs selected from a plurality of video clip pairs to be displayed to a user, each video clip pair including a target video clip and a reference video clip, a display order of the video clip pairs in the set, and display positions of the target video clip and the reference video clip in each video clip pair on a display screen of the user; Displaying, by the processor, the video clip pairs in the set according to the display order and the display positions in the test set, thereby enabling the user to perform a test session and assess quality of the target video clip and the reference video clip in each video clip pair; Collecting, by the processor, feedback regarding the assessed quality for each video clip pair and sending the feedback to a server, wherein the feedback is usable for providing subjective quality evaluation of the plurality of video clip pairs.

In addition, this aspect of the disclosed subject matter can comprise one or more of features (i) to (vi) listed above with respect to the system, mutatis mutandis, in any desired combination or permutation which is technically possible.

In accordance with yet further aspects of the disclosed subject matter, the computerized method for video quality assessment may further comprise an automation unit which is further configured to perform: Receiving or obtaining a configuration comprising source files and indication of corresponding frames to be used, encoder binaries and encoding specifications; Encoding of indicated frames from said source files using said encoder binaries according to said specifications, giving rise to a plurality of video clip pairs to be used in the process of video quality assessment.

In addition, the automation unit may be further configured to write the information pertaining to the plurality of video clip pairs into the server database.

The automation unit may be further configured to control one or more aspects of performing user test sessions or a test round including: deployment of one or more test sessions, posting a job or multiple jobs on a crowdsourcing marketplaces, collecting and managing completed test sessions and managing payment to the one or more users who completed a test session.

In accordance with yet another aspect of the presently disclosed subject matter, there is provided a non-transitory computer readable storage medium tangibly embodying a program of instructions that, when executed by a computer, cause the computer to perform the method steps of any of the methods disclosed above.

BRIEF DESCRIPTION OF THE DRAWINGS

The above needs are at least partially met through provision of the apparatus and method for subjective video quality evaluation described in the following detailed description, particularly when studied in conjunction with the drawings.

In order to understand the presently disclosed subject matter and to see how it may be carried out in practice, embodiments will now be described, by way of non-limiting example only, with reference to the accompanying drawings, in which:

FIG. 7 illustrates an example of a scenes file used for automated subjective quality evaluation in accordance with certain embodiments of the presently disclosed subject matter;

FIG. 8 illustrates an example of a test set result, obtained in accordance with certain embodiments of the presently disclosed subject matter;

Figure 1:
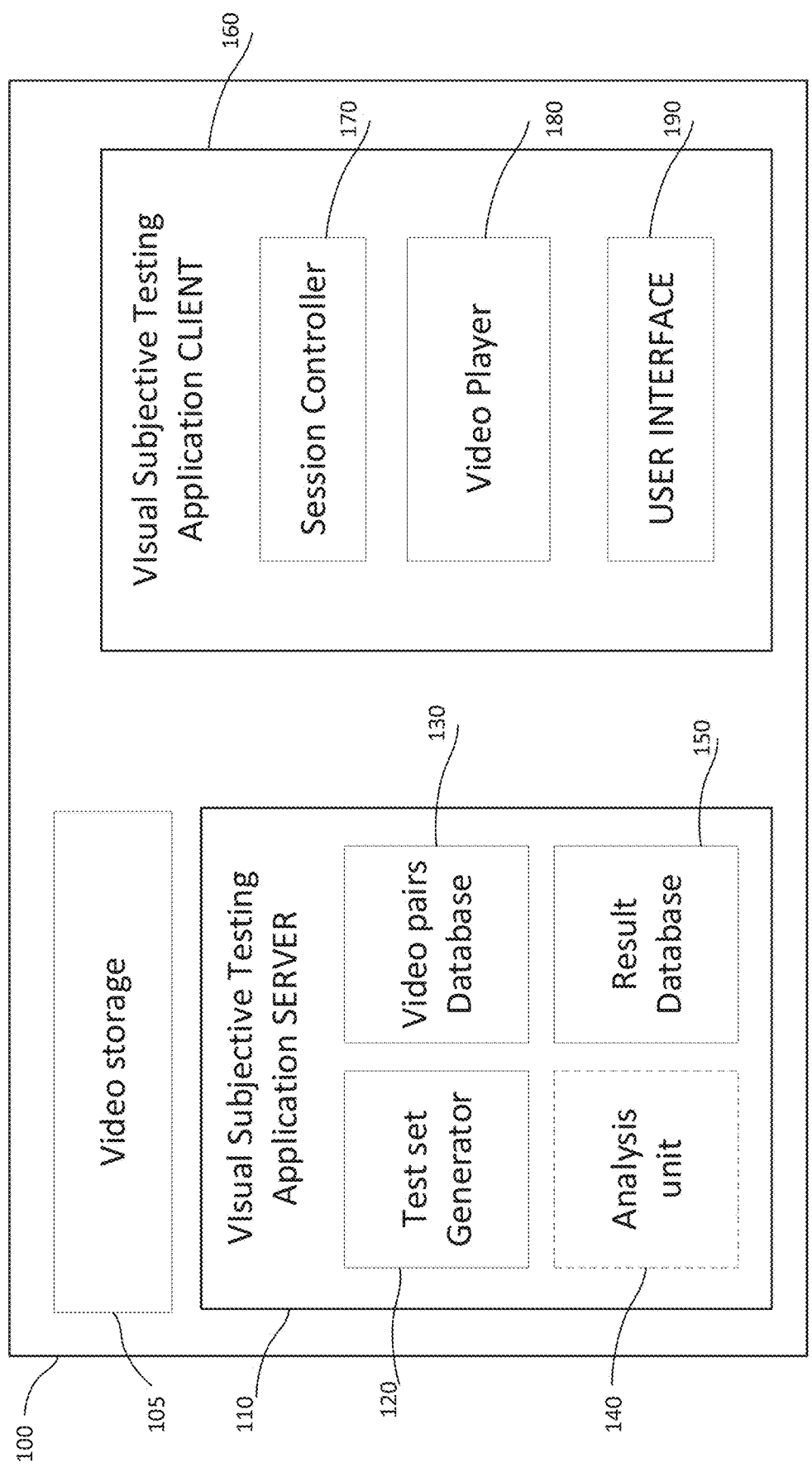
FIG. 1 illustrates a block diagram of a computerized system for subjective quality evaluation in accordance with certain embodiments of the presently disclosed subject matter.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have their ordinary technical meaning as are accorded to such terms and expressions by persons skilled in the technical field as set forth above, except where different specific meanings have otherwise been set forth herein.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "receiving", "decoding", "displaying", "playing", "cropping", "processing", "calculating", "computing", "estimating", "configuring", "filtering", "obtaining", "generating", "using", "extracting", "performing", "placing", "adding", "partitioning", "applying", "comparing", "scaling", "collecting", "clipping", "multiplying", "repeating", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the system/apparatus and parts thereof as well as the control circuit/circuitry therein disclosed in the present application.

The terms "non-transitory memory" and "non-transitory storage medium" used herein should be expansively construed to cover any volatile or non-volatile computer memory suitable to the presently disclosed subject matter.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Generally speaking, pursuant to these various embodiments, the input to the system described herein are a set of video streams, video clips, or video files and the output of the system is configured to provide information regarding the subjective opinions of viewers who viewed video stream pairs. The system includes a server with a primary task to create test sets comprising multiple side by side video pairs, and a client application with the primary role of displaying video pairs to a viewer and receiving the viewer subjective opinion regarding relative quality of the videos in the pair. It will be noted that some of the operations described herein do not relate to the novel aspects of the invention but are provided for the sake of completeness and clarity. Both the client and the server are implemented by way of a processor configured to perform the relevant operations, for example by way of a software that generates commands executed by a CPU.

By one approach, the computerized system for visual subjective quality evaluation may consist of two components: A client and a server. In some embodiments of the system described herein these components may each be installed and activated on a separate general purpose computer, in other embodiments they may be located on the same computer and in yet other embodiments the server may be located on a virtual machine or in the cloud, while the client is installed and run on multiple user computers or devices.

The terms test set, test session and test round appear throughout this specification and will now be explained. A test set refers to a set of video pairs that are to be viewed in a specific test session. A test set may have associated with it a set of instructions, which indicate as well as the clip pairs to be used in the test set, also instructions regarding display order of these pairs i.e. which pair is played first, which second etc. and may or may not include also accompanying metadata on the test set such as display position—which video shall be displayed on the left and which on the right for each pair, how many replays of each pair are supported etc. A test session refers to a complete test performed by a single user and may or may not include also the feedback from the user and metadata related to the test session such as a number of times each video pair was displayed to the user. A test round refers to multiple test sessions performed by one or more users.

The system described herein enables collecting user opinions for subjective assessment of visual quality. This can be used for the purpose of development, calibration and verification of video content quality, video compression quality and/or video quality metrics. The system comprises a front-end or client application—which is what users see and experience, and the backend or server which is responsible for example for providing the clips, or links to the clips, to be viewed, collecting the user inputs, and/or creating a results database.

Each videos clip displayed in the client may comprise a compressed video file or stream, for example an H.264 (AVC), H.265 (HEW), VP9, AV1, VVC elementary stream or any other compressed video format, in which case the client will need to decode the video in order to display it. In other embodiments the video may comprise uncompressed video which can be directly displayed using the device graphic card. The two video clips in each pair may or may not have the same resolution, aspect ratio, frame rate—in which case the video player in the client application may perform an alignment such as resize in order to align the displayed videos. It is generally expected that in each video pair both videos will have the same duration.

Referring now to the drawings, in FIG. 1, there is illustrated a block diagram of a computerized system for subjective quality evaluation in accordance with certain embodiments of the presently disclosed subject matter. There is presented an enabling computer-based apparatus/system 100 configured to perform subjective testing or assessment of video quality. In some embodiments, this system may comprise two primary building blocks, A Visual Subjective Testing Application (VISTA) server 110 and a Visual Subjective Testing Application (VISTA) client 160. In some embodiments, this system may further comprise a video storage unit 105, which may be part of the server block 110 or external to it. In some embodiments the video storage unit 105 contains the actual video streams or video files that are to be compared during the viewing session. Note that the terms video stream, video content and video files are used interchangeably herein, and all terms refer to the video content that is to be evaluated. In other embodiments, we may refer to the videos in the storage unit 105 as source videos from which the video files that are to be compared are derived by processes such as but not limited to clipping, processing and/or transcoding. As aforementioned, blocks 110, 160 and 105 may reside on the same physical computer, on different physical computers, or use cloud resources—which is in particular beneficial for the server block 110 and storage block 105. Generally speaking, in order to carry out a test round, a single server entity is used to serve multiple client invocations—serially, sequentially, in parallel, or a combination thereof. As further shown in FIG. 1, each of the server 110 and client 160 may comprise a number of internal blocks, details of which follow shortly. However first, in order to help clarify some of the terms used, an explanation on the system is provided, in accordance with certain embodiments of the presently disclosed subject matter.

As part of the design of the VISTA client unit 160, a method of quality grading or scaling should be selected. For example, two types of subjective video quality evaluation tasks may be defined as: 1. Making sure that a 'target' encode has the same perceptual quality as a 'source'—be that a source video (compressed or uncompressed) or a source encode. 2. Comparing two encodes, obtained for example by two different encoders or by an encoder used with two different configurations, to see which provides better subjective quality. These two testing modes can for example use the Forced-Choice Double-Stimulus test to perform the quality evaluation, as this test compares two video sequences to each other, and the quality observation is relative rather than absolute.

The rigorous testing guidelines such as calibrating the test environment and monitors, which are set forth in the aforementioned BT.500 recommendation, cannot be met by end-user testing in an uncontrolled environment. However, ITU-T recommendation P.913 relaxes these and makes user side testing applicable. We believe that testing in "true-world" scenarios is equally if not more important than testing in the lab using a limited set of screens in a controlled environment.

Recommendations P.913 and BT.500 concur regarding using a presentation method where pictures or video sequences are shown in succession with a gray screen in between. However, this is perhaps not challenging enough, for example to meet customer expectations for quality comparison, and therefore in at least some embodiments the videos are displayed side by-side rather than consecutively.

It is desired to make the VISTA client a seamless and easy to use application, which operates in a fully automated manner, and does not require the user to go through multiple or complicated steps to perform the evaluation, thus allowing the user to focus purely on the video quality assessment. Therefore, it is recommended to design the client application so that the usage is very simple, with video retrieval and playback being automatic and using only a minimalistic API. In an example embodiment the client may include display of a brief introduction on how to perform the test. In an example implementation the BeamrView video viewer, or a sub-set of that package, which supports video pair decode and synchronized side-by-side playback, may be integrated into the client application and used for displaying the video pairs.

In an example embodiment the VISTA backend, or server 110, has a few tasks. The first, is to store pointers or links to the video clip pairs used for testing, with their associated metadata. In an example embodiment the actual clips may be stored for example in Amazon S3 cloud storage. The second task is to build the test set, or set of instruction for the client, which describes the user test or test session. To be able to reach reliable conclusions from a VISTA testing round, the test sets per client session should be selected and configured carefully—as detailed below. Finally, the server collects and stores all the information obtained during each client session for later analysis. The VISTA backend can in a non-limiting example be implemented using Amazon DynamoDB, which is a high-performance database with built-in security, backup and restore and in-memory caching, developed for internet-scale applications.

We now provide an example of test set configuration in a non-limiting example of a possible embodiment. For the sake of simplicity and without limitation of generality, we will label the videos on one of the video sets as 'reference', or 'source', and the videos of the other video set as 'target'. Most of the video pairs in each test set may be associated with the desired comparison or evaluation. In addition, since it is desirable to be able to ascertain that a user provided reliable test results, additional pairs may be created for which the target clip is visibly degraded, meaning it (clearly) has lower visual quality than the source. These are user validation, or user verification, pairs and are used to verify user answers are valid: results of users who selected the source as the lower quality clip in these user validation pairs, will be rejected and not incorporated into the result analysis. In some embodiments, tests may also include pairs showing the same clip on both sides. These are statistical validation pairs. The purpose of statistical validation pairs is to gather information regarding the statistical significance of the obtained results.

It is possible to assign different difficulty levels to different pair types. In a non-limiting example we may use difficulties in the range 0-10 and set user validation pairs to have difficulty equal 0, target pairs may have difficulty 5 and the statistical validation pairs will be set to difficulty 10, indicating it is impossible to discern which has lower quality. Then when building the test set, it is possible to apply a configuration, determining the quota, or number of pairs to include, at each difficulty level.

In this case, a non-limiting example of a possible session in an example embodiment, each test set may consist of 20 video pairs. These 20 pairs in turn may consist of fourteen pairs of the actual target vs. source comparisons with difficulty 5, four user validation pairs with difficulty 0 and two cases where both sides show the same stream for statistics purposes, with difficulty 10. The VISTA backend may construct each test set to be semi-random, or pseudo-random, thus avoiding long sequences of source being displayed on the same side and dispersing the user validation tests semi-uniformly along the test. The reason pseudo-random is used in selecting display side for each clip in the pair is that in true random selection it is possible to have quite a long run of the same placing of the 'degraded' video, something that it is better to avoid in order to not bring the viewer to a state of reduced attention.

The selection of videos to use in each test is also semi-randomized, in a way that equalizes the numbers of viewings of each source-target video pair across multiple client sessions.

In some embodiments it is desired to have the user always view the clips side by side at 100% zoom. In this case a crop of the frame may be applied when needed, so that the extracted section of each clip covers at most half of the user screen. This crop may be randomized per each clip pair in each test session, in order to obtain good coverage, and information regarding the actual displayed area may be stored as part of the test metadata.

As can be surmised from this, each test set is essentially a set of instructions, created by the test session creation utility in the backend and provided to the client, e.g. VISTA application. These test set instructions control the test session performed by the user.

Turning back to block 110 in FIG. 1, the Video pairs Database 130 is a block that may store the aforementioned links or pointers to the video files or streams, and optionally video pair metadata which may comprise of one or more of the following: pair difficulty level, video resolution (video frame dimensions), video frame rate, video duration indicated by number of frames or as measured in a time unit such as milliseconds, and possibly other properties of the video content or its creation process. A processor unit configured to generate test sets is termed 'test set Generator' 120. It generates the test set for each user session, using a configuration either stored within the Generator or supplied externally as explained in regard to FIG. 1B. A Result Database 150 stores all the information collected from each user, comprising one or more of the following: User identifier or details, per-pair and per-user information regarding which clips were viewed and how (such as cropping, which clip was on which side, number of replays) and the submitted response or opinion provided by each user for each pair. Optionally additional metadata as coordinated between the client and server APIs may be stored. An optional Analysis unit 140, performs analysis of the results in order to provide processed results rather than raw data. This unit may be part of the server unit 110, or may be performed externally to the system, in which case the output of the system depicted by block 100 will be the full set of data stored in the Result Database.

Turning now to block 160 in FIG. 1 there are illustrated possible blocks contained within the processor unit configured to perform a test session, which we term VISTA client. A Session Controller 170 receives the test set information from the server, for example from the Test set Generator 120, and configures or controls the test session. This block may also perform video file download from the video storage unit 105, according to the clips specified for use in the test set. A video player 180 is responsible for the on-screen display of the videos, and for example may perform side-by-side playback of two clips comprising a video pair. In a non-limiting example, for each frame pair in each displayed video pair, the player 180 performs the following operations: decode, joining of two corresponding video frames to a complete frame, conversion to RGB and display on the user screen. A User interface 190 manages and supplies the UI for the client, which for example may consist of presenting the required screens and 'buttons' and obtaining the users' selections.

Figure 1B:
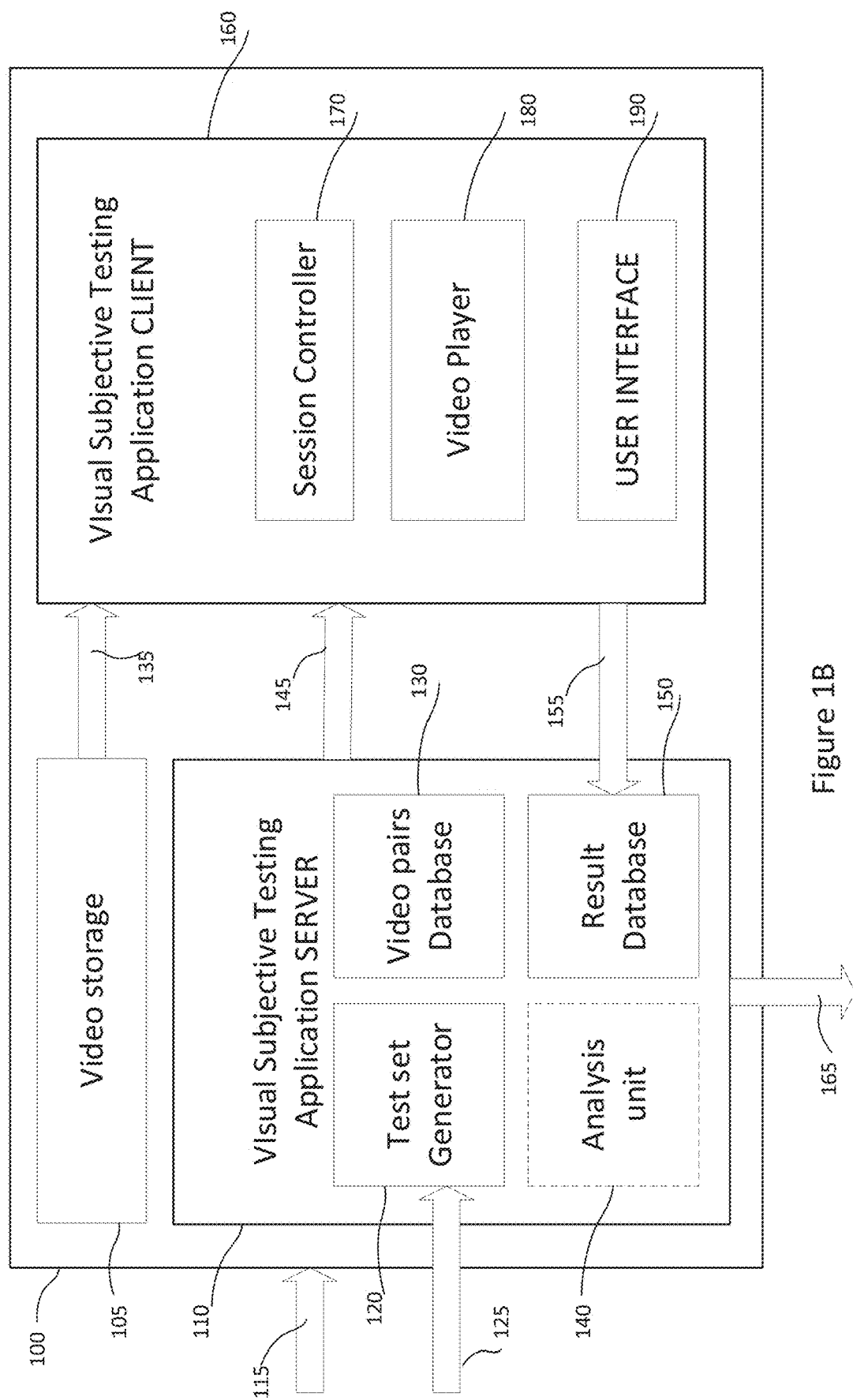
FIG. 1B illustrates the data flow in a block diagram of a computerized system for subjective quality evaluation in accordance with certain embodiments of the presently disclosed subject matter.

Turning now to FIG. 1B, there are illustrated possible inputs, outputs and data flow in a block diagram of a computerized system for subjective quality evaluation in accordance with certain embodiments of the presently disclosed subject matter. The inputs into system 100 configured to perform subjective testing of video quality may include flow 115 comprising video streams or files. In some embodiments these consists of multiple video pairs for which the subjective quality evaluation is to be performed, e.g., target video pairs. In other exemplary embodiments, the input video streams may consist of the aforementioned target video pairs and also of user validation video pairs and/or statistical validation video pairs, as previously mentioned. Alternatively, in other embodiments input 115 may comprise source video files which are to be processed to yield the actual video content to be viewed. Input 115 may further comprise information regarding the input video such as but not limited to one or more of the frame resolution, the duration of each video, information regarding which video files or sequences are to be viewed as a pair, and pair difficulties.

An additional input in an example embodiment of the presently disclosed subject matter is a test set configuration 125. This configuration is provided to a Test set Generator 120 and configures each test set by determining for example one or more of number of clips to use per viewing session, number of clips in a viewing session at each level of difficulty, preferred placing among test pairs of specific difficulty levels etc.

The output from system 100, illustrated by flow 165, may comprise results collected in the test round directly from a Result Database 150, such as but not limited to, the feedback collected from each user or viewer on each displayed clip pair, possibly with additional data such as viewing duration, number of replays etc. Alternatively, the output 165 may be provided after processing in an Analysis unit 140 and comprise the processed result(s) of the subjective quality evaluation test round, for example information on the statistical certainty of perceptual identity of the target video pairs, or in another example per user and/or per clip statistics such as percentage of viewings where target clip was selected as having lower quality for each target clip pair.

Within system 100, the interfaces between the units may comprise flow 145 illustrating a Server 110 providing test set information to a client 160, wherein this information is used by a session Controller 170 to control the test session. The interfaces may further comprise flow 135 wherein a Video storage 105 provides files required for the test session to a client 160 for example using http download (or any other transport protocol e.g. "copy", "secure copy", "ftp" etc.) and may further comprise flow 155 wherein a client 160 reports test results to a Server 110 and wherein the test results may comprise selections made by the user, number of replays per clip, user screen resolution, selected video frame area in the case cropping was used etc.

As explained, each session can consist of certain number of video pairs as determined for example by an input configuration. In some embodiments the pairs used in a test set will be selected randomly from a prepared set of video pairs. Generally, it is advisable that in about 50% of the cases the display position will be such that target clip shall be on the left, and in about 50% of the cases the target clip shall be on the right.

In each session some, for example 4, of the pairs may comprise a 'source' or reference video and a 'target' video that has been significantly degraded intentionally, to check the reliability of the user. If the user does not correctly identify the degraded video in this pair, the results of the whole session may be ignored.

Each video can be shown at 100% zoom (where each pixel in the image corresponds to a pixel on the screen), and playback of both videos shall be time-synchronized to the frame level. If the video resolution is larger than the available viewport resolution for displaying the video, the video can be cropped—only a random portion of the video shall be shown. Videos that are smaller than full screen resolution may be displayed vertically centered, horizontally justified to the center, and with a grey background.

It is recommended that the application is configured to always be displayed in full-screen mode to ensure the user is focused only on the visual content of the app and not on other items on the screen.

Figure 2:
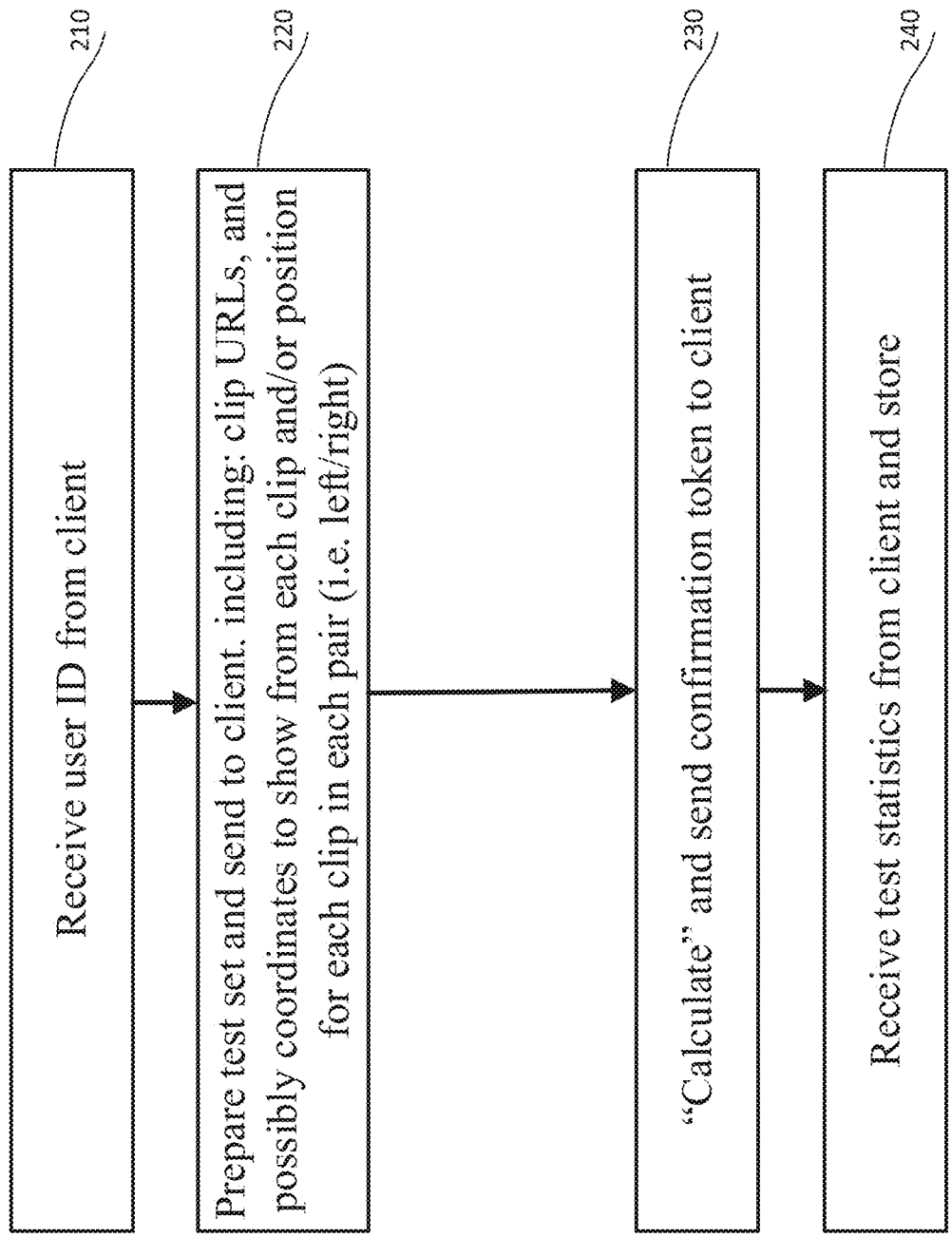
FIG. 2 illustrates a generalized flowchart of the server, or backend, component of a computerized system for subjective quality evaluation in accordance with certain embodiments of the presently disclosed subject matter.

Turning now to FIG. 2, there is illustrated a generalized flowchart of a server component, or backend, of a computerized system for subjective quality evaluation in accordance with certain embodiments of the presently disclosed subject matter. When a test session begins, the server receives a user ID in block 210 transmitted from the client. This ID may for example comprise a user email, a user worker ID assigned by an underlying crowd-sourcing framework or any such similar user ID. This ID may be used within VISTA for example to identify the results associated with a specific user, and possibly to manage user compensation.

In step 220, the Test set Generator prepares a test set and sends it to the client. As aforementioned the test set includes indications of which video files or streams to use in the test session which for example may be presented as URLs pointing to the video files location, and may also include further information in the test set such as one or more of the following non limiting examples: Information for each pair re which clip to show on which side of the screen, cropping coordinates of the video frames when video dimensions are such that side by side view of the full frame on left and right exceed the user screen resolution and information re configuration of the test such as how many replays are allowed.

We now provide an example for generating a test set. In this example each test set contains 20 pairs of videos, which are selected from a pre-determined set of video-pairs. The selection of videos from the full set or database is semi-randomized, so that all videos are included in about the same number of test-sets.

Each pair contains a source (or reference) and target video. Generally, the source is a higher quality encode with the target being a lower quality, for example an original and optimized stream pair. The display position of each video (left/right) is semi-randomized, such that we never have sequences of 3 or more consecutive pairs where display positioning is identical. For example, if pairs 6 and 7 have high quality video on the left, then pairs 5 and 8 must have high quality video placed on the right.

If for example each test set includes exactly 4 verification pairs, in one embodiment of the subject matter presented herein, it is possible that these pairs will be placed in display order within the test set as follows: 1st verification video in random slot chosen from slots 2-5; 2nd verification video in random slot chosen from slots 6-10; 3rd verification video in random slot chosen from slots 11-15; 4th verification video in random slot chosen from slots 16-20.

Upon completion of the test session by the user, the client informs the server that the session is complete and in cases where the user requests a confirmation code—for example, in order to receive compensation for the viewing task, the server in 230 "calculates" or uses some hash algorithm to create a confirmation token which is sent to the client and displayed to the user. The results of the test session comprising at least the selections made by the user, and possibly further information such as number of replays, actual viewed area of cropped frames, duration of test etc. are sent by the client and received and stored by the server in 240. While in the example embodiment illustrated here the receiving and storing is performed at the end of the test session, in other embodiments the client-server communication is ongoing throughout the test session so that after the user makes a selection at the end of each clip pair this information is aggregated and stored by the server.

Figure 3:
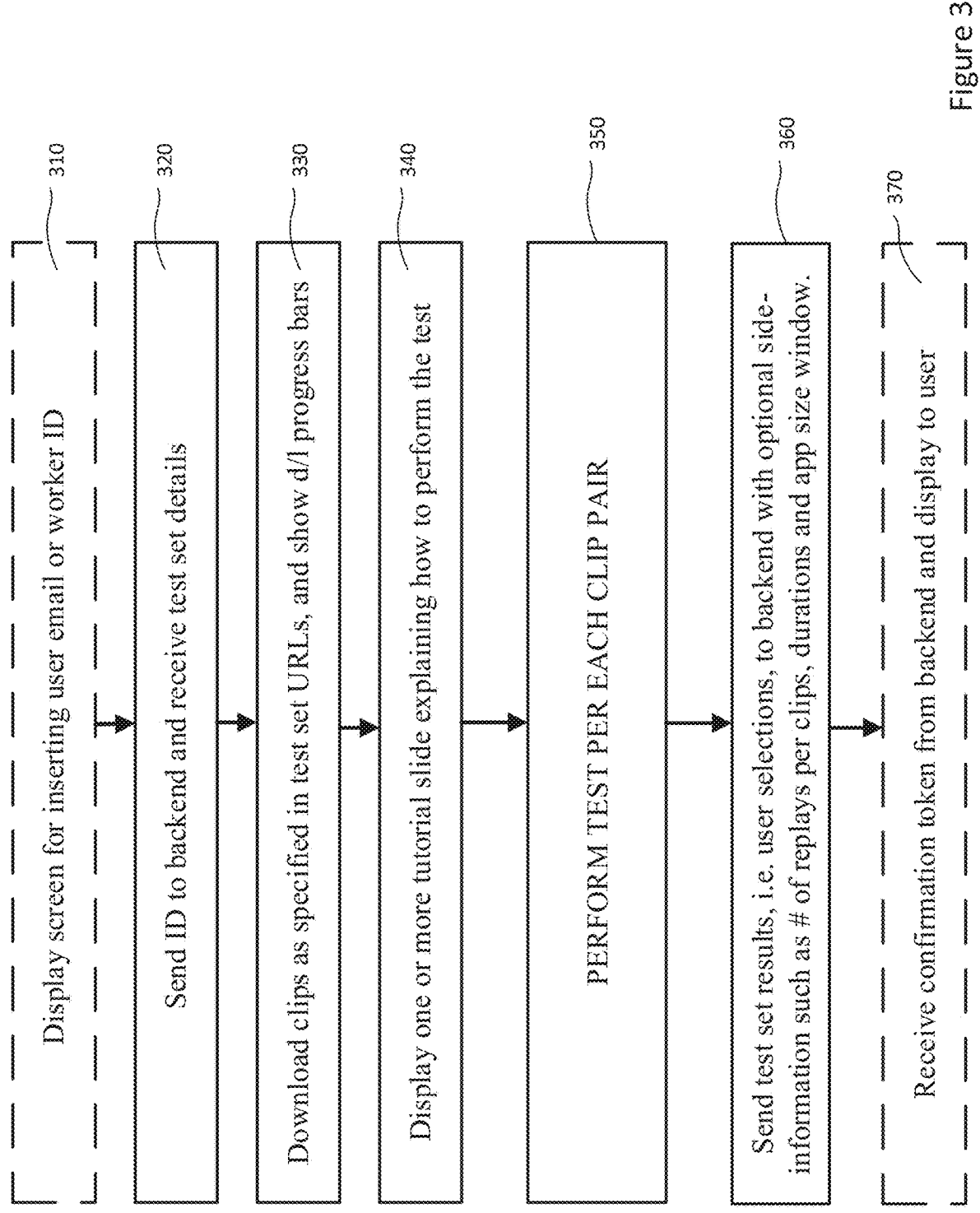
FIG. 3 illustrates a generalized flowchart of the client or user-side application component of a computerized system for subjective quality evaluation in accordance with certain embodiments of the presently disclosed subject matter.

Turning now to FIG. 3, there is illustrated a generalized flowchart of the client or user-side application component of a computerized system for subjective quality evaluation in accordance with certain embodiments of the presently disclosed subject matter. In this flow, upon launching the client application, the user may be asked to provide an email or workerID as illustrated in optional block 310. This ID is then sent to the backend or server as illustrated in 320, which also illustrates that the client application now receives from the server or backend a test set which comprises pointers to the pairs of clips to be viewed, or the actual clips, as well as various instructions and configuration information for performing the test session.

As illustrated in 330, the client may download all the video files for the test, as indicated in the test set instructions provided by the backend. By downloading the clips and then playing them back from local storage rather than streaming them over the Internet, network issues which may impact video quality are avoided. However, it is also possible in other embodiments to obtain the video pairs during the test session using a streaming based approach or on a just-in-time basis during the test-session.

Figure 6A:
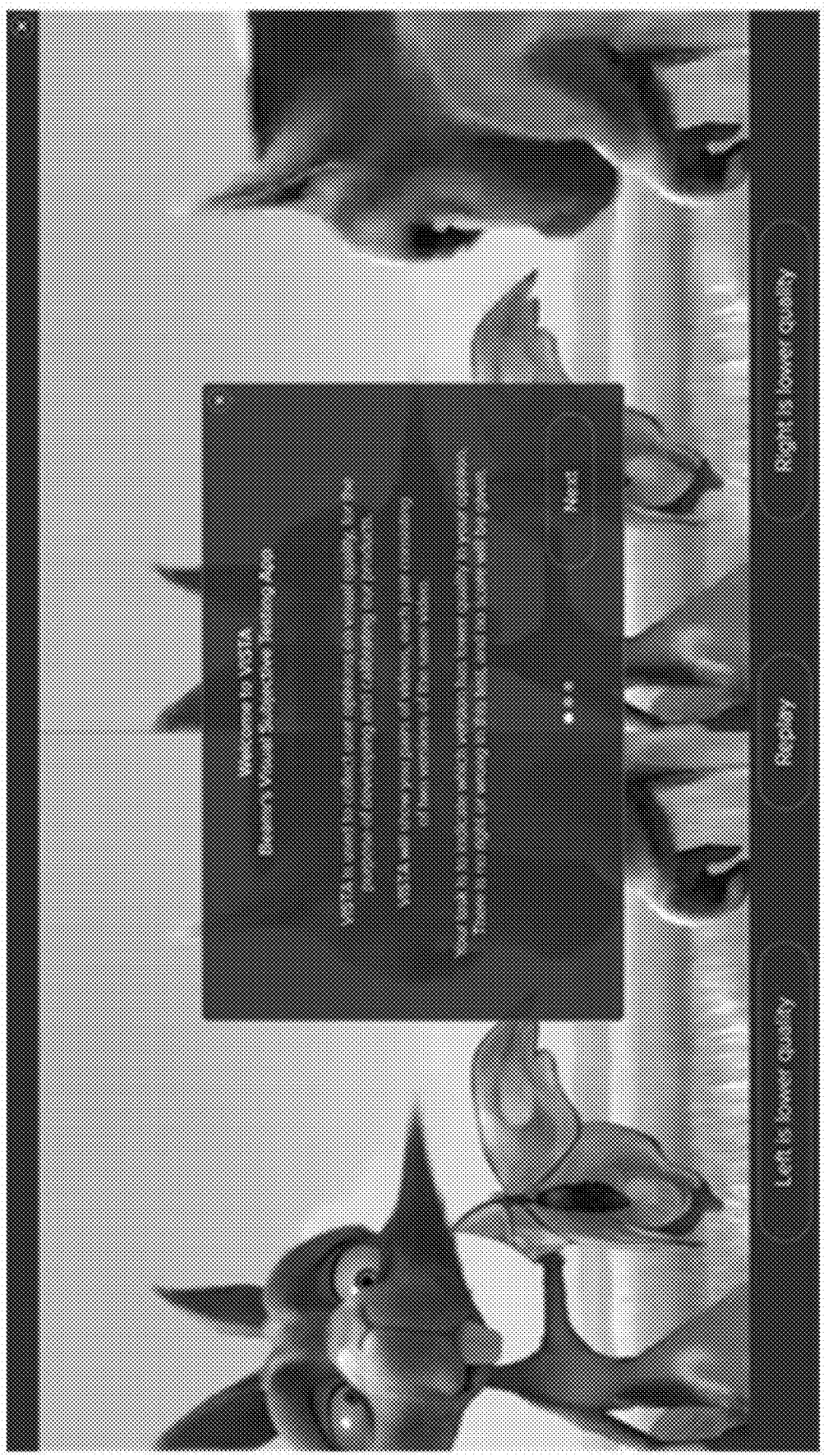
FIGS. 6A, 6B and 6C illustrate example screen captures from the client or user-side application component of a computerized system for subjective quality evaluation in accordance with certain embodiments of the presently disclosed subject matter.

To keep the process of performing a test session self-contained and easy, in some embodiments, in a stage corresponding to 340 the user goes through one or more brief explanation screens, such as the screen shown in FIG. 6A. More details on this block are provided below in reference to FIG. 4 and FIG. 4B.

Figure 6B:
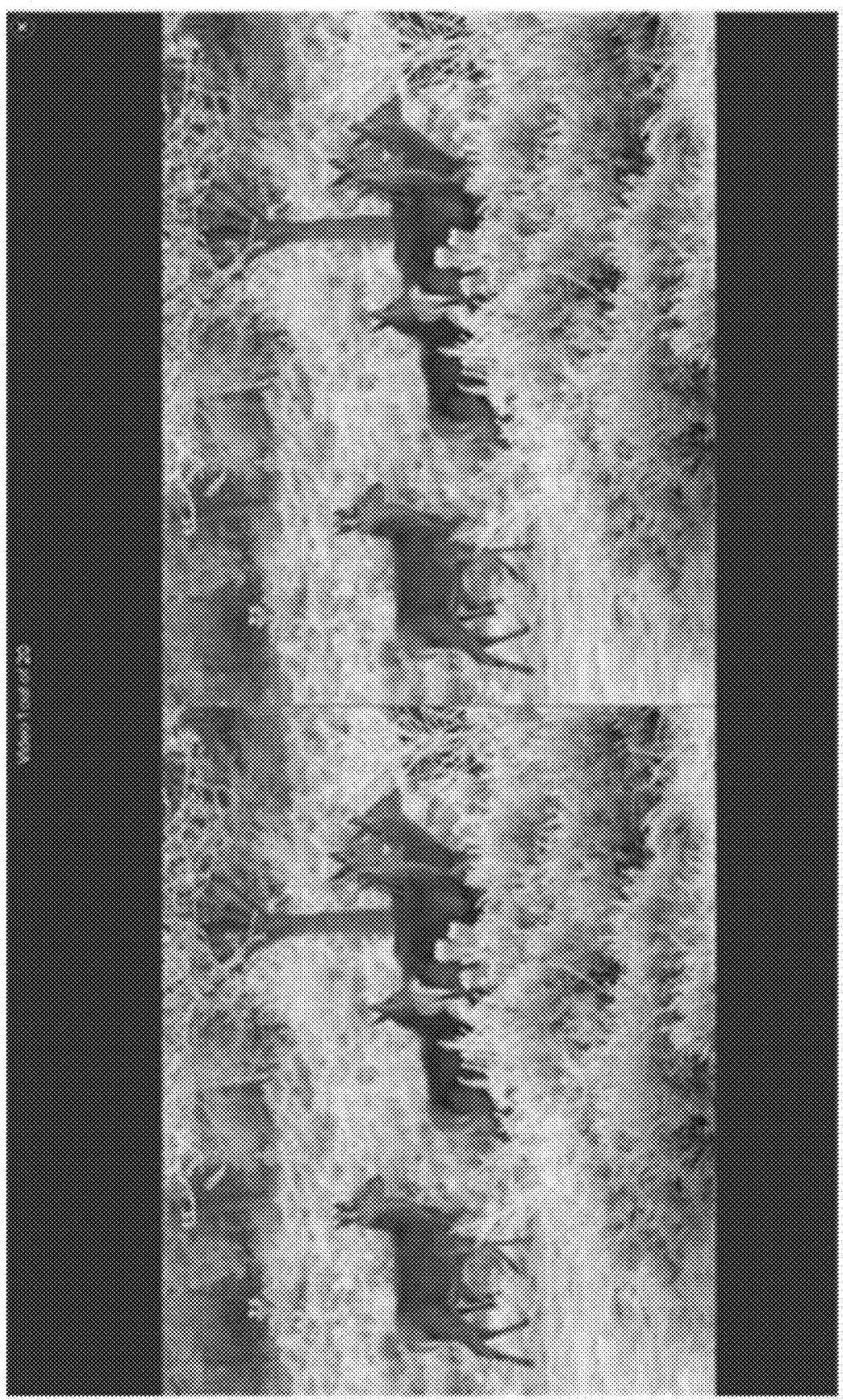
Figure 6C:
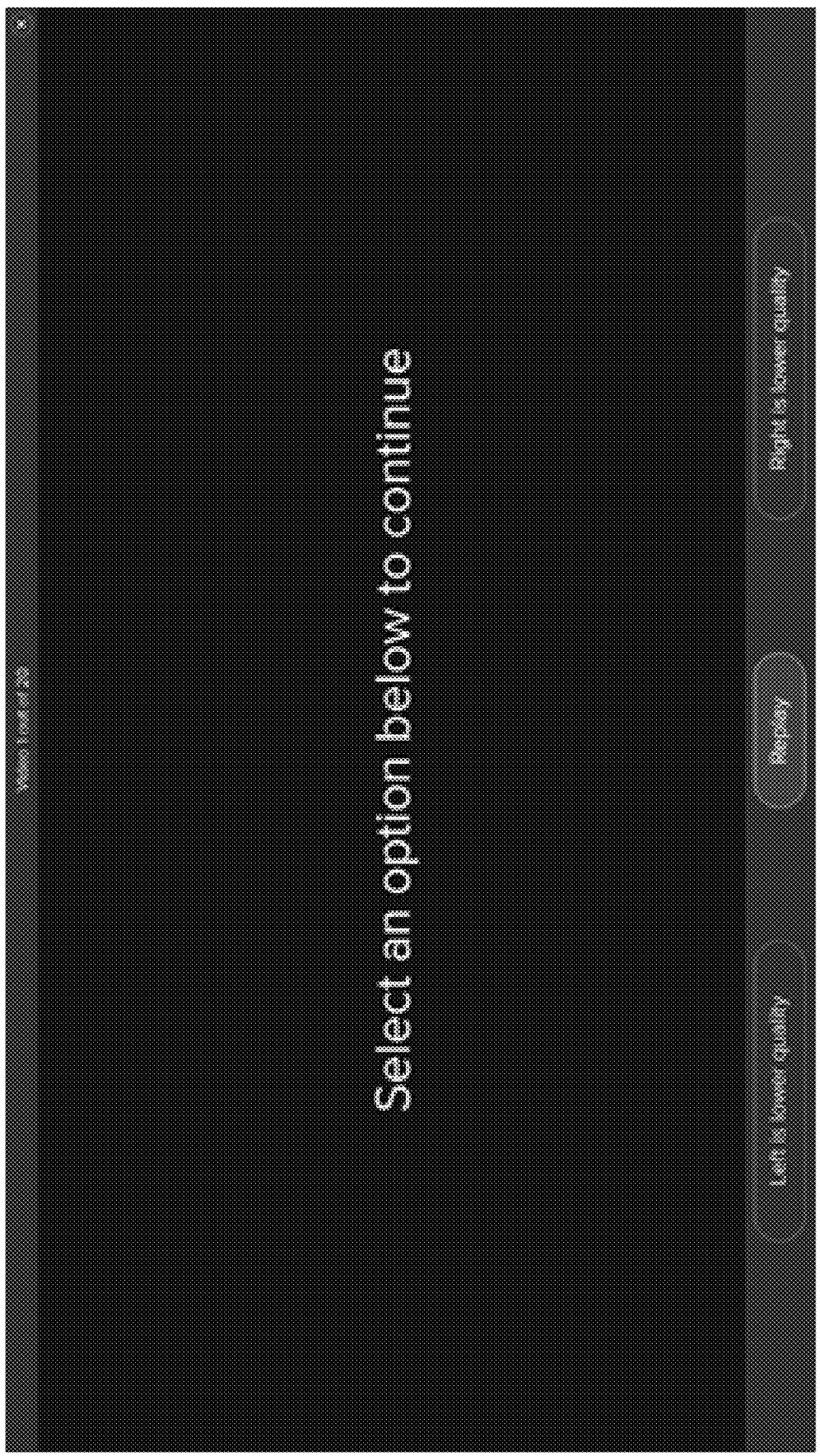

Then, as shown in 350, for each of the test pairs in the test set, the streams are displayed to the user, in motion, side-by-side, according to the instruction set from the server, in the order as specified in the display order part of the test set instructions. An example of the screen during this stage is shown in FIG. 6B. It is advisable, though not in any way mandatory, to use clips of about 10 second duration—to allow enough time for the viewer to get an impression of the relative quality but avoid tiring the viewer. At the end of the playback of a video pair, the user provides feedback regarding the relative quality. For example, as shown in FIG. 6C, the user may select if the left clip had lower quality, or if the right clip had lower quality, or select to view the clips again. After the maximum number of replays is reached, the user must make a selection in order to proceed to the next pair. In some embodiments, at this stage the user is shown an additional choice to indicate that both clips seem identical—veering from the forced choice approach.

After all video pair comparisons are complete, the user can submit the test results and in 360 the client sends results of the test session to the server. These results include at least the user selections or feedback and optionally also additional information such as but not limited to number of views per clip pair, duration of the viewings etc. In some embodiments it is possible for this data to be transmitted during the test session, for example for each pair after a decision is provided by the user, in which case block 360 is effectively ongoing throughout the test session. Finally, in 370 the client may optionally display to the user a confirmation token received from the server, for example to use when requesting reimbursement for the task. The test session then concludes.

Figure 4:
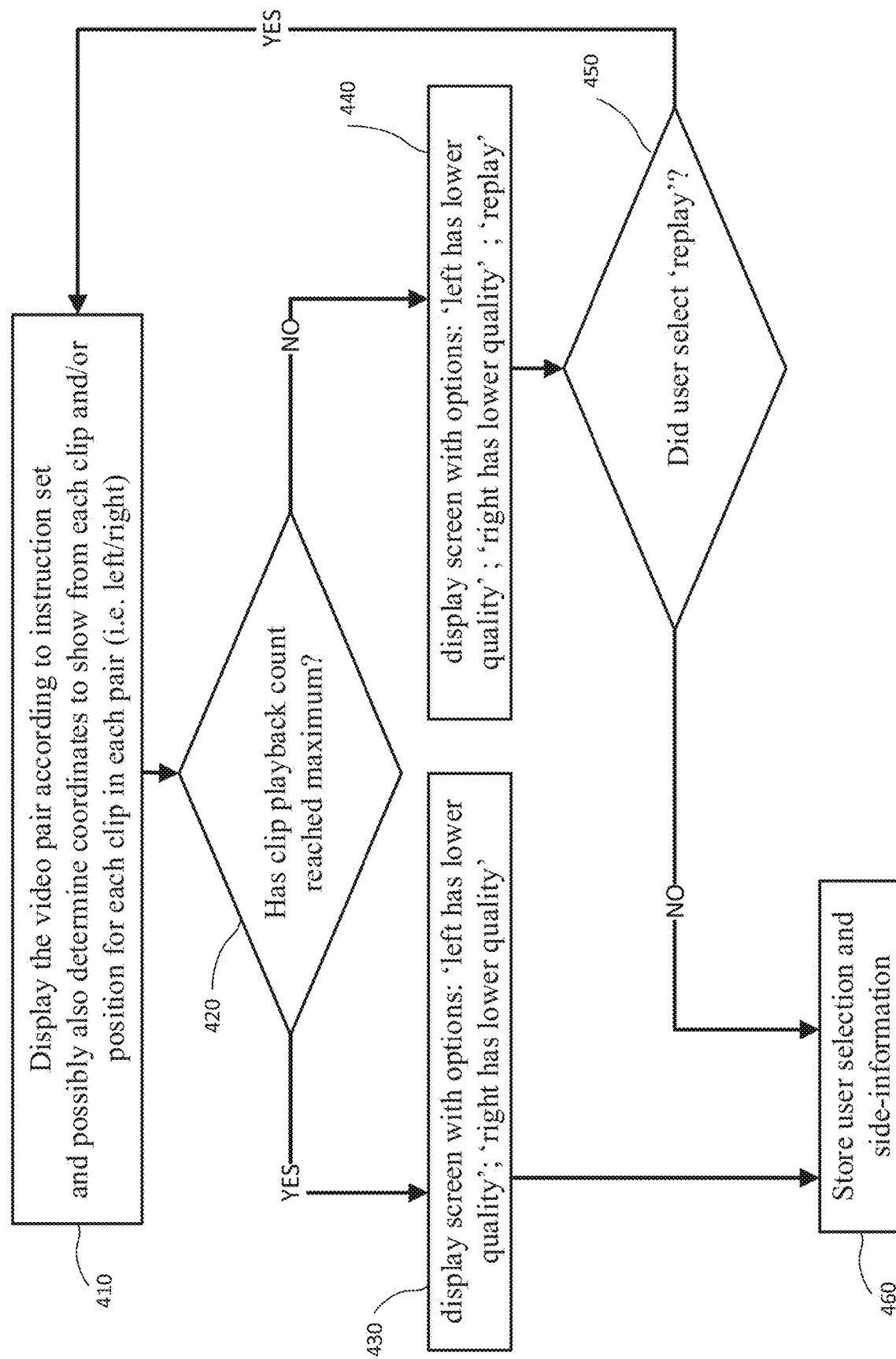
FIGS. 4 and 4B Illustrate example flows of video pair display in the client or user-side application component of a computerized system for subjective quality evaluation in accordance with certain embodiments of the presently disclosed subject matter.
Figure 4B:
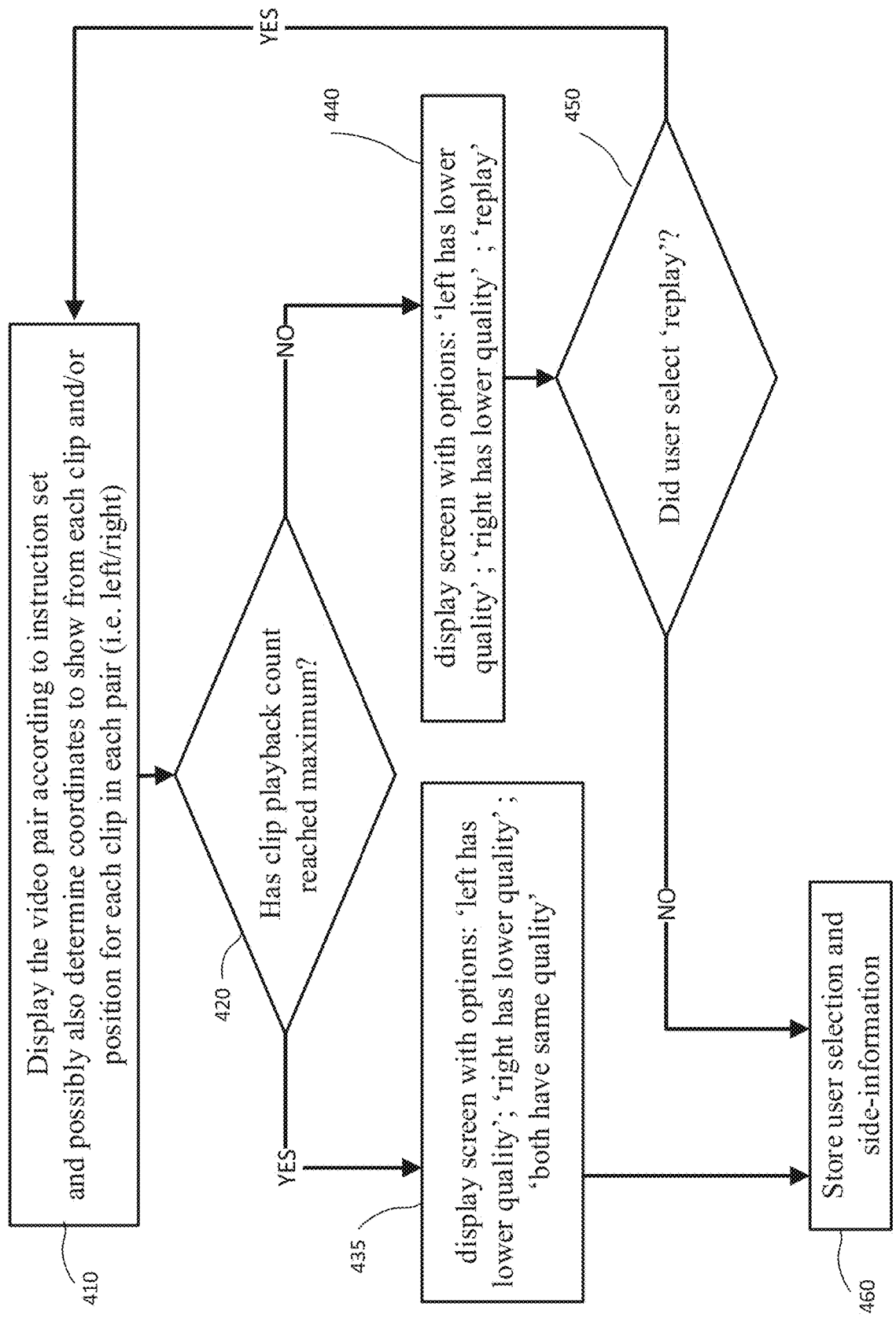

Turning now to FIGS. 4 and 4B there are illustrated example flows for video pair display in the client or user-side application component of a computerized system for subjective quality evaluation in accordance with certain embodiments of the presently disclosed subject matter. These figures correspond to example embodiments of block 350 in FIG. 3. The subjective video quality testing described herein is performed by showing pairs of videos to the user. In block 410, the two videos comprising the current video pair are shown to the user side-by-side, with a pseudo-random selection regarding which video is shown on which side. In some embodiments this decision may be obtained from the server as part of the test set information, and in others may be determined in the session controller within the client. Possibly some added processing is applied by the video player in the client such as cropping of video frames in order to fit in the user screen, resize if the two videos comprising the current pair have different resolution, adaptation of frame rate etc. An example screen shot of the viewer screen at this stage is shown in FIG. 6B.

When one playback of the video pair completes, in block 420 the client evaluates whether maximum number of replays, specified in the test configuration has been reached. If it has, the flow proceeds to block 430 in the example in FIG. 4 and to block 435 in the example in FIG. 4B. If not, the flow proceeds to block 440 for both examples. In the example illustrated in FIG. 4, in block 430 the client requests the user to make a selection among "left has lower quality" and "right has lower quality". In the example illustrated FIG. 4B, in Hock 435 we slightly deviate from the forced-choice methodology and request the user selects among "left has lower quality", "right has lower quality" and "they appear the same". This approach is beneficial primarily when using co-operative viewers in small to medium scale testing. Upon completion of playback, when maximum replays was not reached, in block 440 the client requests the user to select among options "left has lower quality", "right has lower quality" and "replay" as illustrated in the screen capture shown in FIG. 6C. If the user chooses to replay, the client returns to block 410. Otherwise, the flow proceeds to block 460 where the information regarding the user selection and accompanying data such as number of replays, duration, processing applied etc. is stored by the client and transmitted back to the server, at some time prior to session completion.

In an example implementation the client UX flow may be as follows. When the user launches the app, the user may be requested to provide an ID, which can be either an email address or Amazon Mechanical Turk WorkerID. This component is completely optional and may not be used in some embodiments.

In an example implementation, the client will start downloading the video files from the server. To avoid buffering issues during playback which may impact the subjective assessment, it is recommended that the clip pairs be downloaded upon first launch of the app, and cached for future use according to the client-server API. During download, the client may show a progress bar for each downloaded file, and an overall progress bar for all files. After the file download is complete, the client may show a 4-slide tutorial slideshow, which explains how to use the app. The user should be able to close the tutorial, move to the next slide, or move to the previous slide. On the last slide of the tutorial, the "Next" slide button will be replaced with a "Start the Test" button. When the user presses the "Start the Test" button, or if he pressed the "close" button on the tutorial window, the test shall start. During the test, the user will be shown 20 clip pairs as described in the example test set construction above.

During playback of each pair, the top bar may display "Video x out of y" and an 'X' button on the top right corner for closing the app. A confirmation dialog may be displayed when the user presses the "X" button. It is recommended that the bar with the selection buttons is not shown during playback, to avoid distraction.

After playback of each pair, a grey screen may be shown, with 3 buttons: "Left is lower quality", "Right is lower quality" and "Replay video". The text message on the screen may be "Select an option below to continue".

If the user selects "Replay video", the video pair will be played again, and then the grey screen with the 3 buttons will be displayed again. The number of times the video can be repeated may be limited, for example according to a configuration instruction received from the server. After the maximum number of replays is reached, the "Replay video" button will not be displayed.

The user shall indicate which video has lower quality in their opinion, by clicking on one of the selection buttons "Left is lower quality" and "Right is lower quality". After the user selects the lower quality video, the next clip pair will be loaded and played.

It is recommended that after the user presses one of the bottom buttons, the mouse cursor will return to the middle of the bottom bar when it becomes visible again.

After completing the last video in the set, the client may display a "Thank You" screen with an exit button. The "Thank You" screen may optionally include a unique string or confirmation token, generated by the server, for example for Amazon Mechanical Turk users to present in order to receive compensation for their work.

The client application may be built for a variety of operating systems including but in no way limited to, Windows, Mac OS and Linux.

When planning a test session that will go out to the public, one should be aware of the licensing or rights of the video sources. This can be done by using open source, royalty free video clips or one's own content as the source material.

Figure 5:
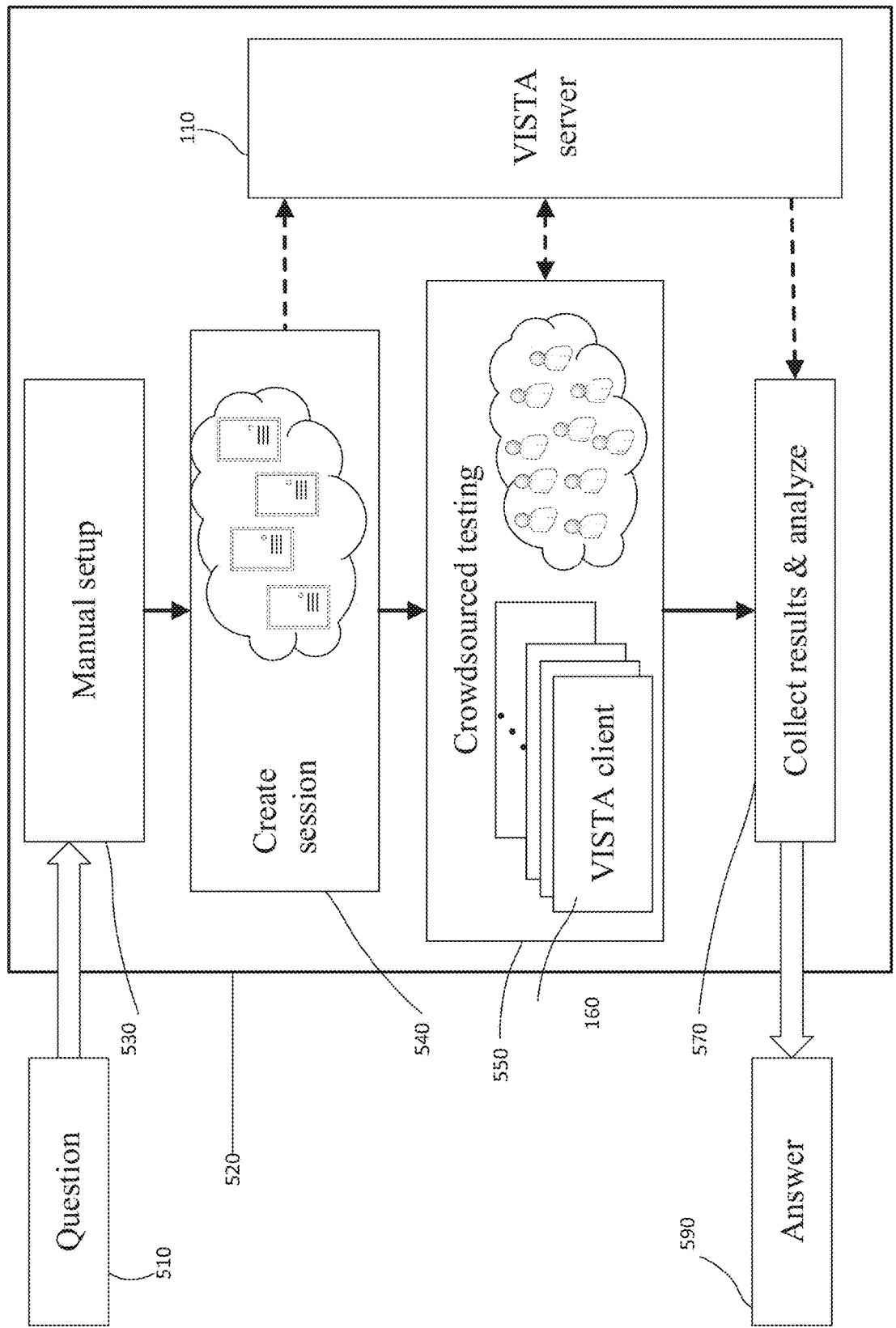
FIG. 5 illustrates a block diagram of a computerized system for automatic large-scale subjective quality evaluation in accordance with certain embodiments of the presently disclosed subject matter.

Turning now to FIG. 5 there is illustrated a block diagram of a computerized system for automatic large-scale subjective quality evaluation in accordance with certain embodiments of the presently disclosed subject matter. To easily obtain reliable results using VISTA, it is possible to add automation to the test preparation, result collection, and most importantly—to the testing stage itself. Herein we will refer to the combined system as Auto-VISTA. Auto-Vista is a combination of the VISTA server, VISTA client and an automation unit.

Auto-VISTA may, in some example embodiment, consist of the stages illustrated in FIG. 5. First, the question we wish to answer with the Auto-VISTA session or test round must be posed, as illustrated in block 510. Then, in block 530, a brief manual setup of the test is performed. The automatic process which creates the test session, for example on the cloud, is then launched in block 540, followed by automated large-scale testing using crowdsourcing in block 550. Finally, results are collected and analyzed in block 570 and the answer to the initial question is obtained in block 590. Next, we provide some more details on each of these steps.

The Auto-VISTA question is represented by block 510. The goal of an Auto-VISTA testing round is to answer a question, so defining the question is crucial for building the test correctly and for finding the answer we seek. The question is generally aimed at comparing two encoding solutions, which may be the same encoder with two different configurations, or two different encoders. The comparison seeks to determine whether one provides superior visual quality to the other, or whether the encodes are perceptually identical to each other. The latter case is of interest for example when the encoding solutions differ in CPU performance or in the bitrate they provide. Without loss of generality, we will assign one of the encoders to be encoder A associated with a set of N video streams, or video clips {VA}, and the second encoder to be encoder B creating video streams labeled as {VB}. Without limitation of generality, one of these may be a 'null' encoder which means an original video is used as-is without undergoing further encode. Then, for each pair of clips VA(n) and VB(n), where n=1, . . . , N, we wish to know whether for an average viewer, when looking at clip pair VA(n) and VB(n), viewed in motion, side-by-side & synced: "Is clip VB(n) perceptually identical to clip VA(n)?" OR "Is clip VB(n) visibly superior, or visibly inferior, to clip VA(n)?".

To launch Auto-VISTA some files and inputs must be prepared manually. This step corresponds to block 530. First, parameters controlling the test set structure need to be configured. These include the number of pairs of each difficulty level to include in a test set, e.g. number of target pair comparisons, number of user-validation pairs and number of statistical-validation pairs, per each test session. They also include other parameters controlling the test sessions, such as the number of replays allowed prior to forcing the choice of the lower quality clip.

As mentioned above, the VISTA server or backend stores pointers or links to all clips used for testing. In the fully automated scenario, these clips will be created in the next step—the automated session creation. This for example may be done by employing a cloud-based encoding solution which for example may use Dockers containing encoder binaries and supports deployment of the encoding tasks on the cloud, for example using AWS EC2 instances. The appropriate Docker images and corresponding configuration for each of the 'source', 'target' and 'user-validation' encodes must be prepared and specified. In addition, a CSV file describing the scenes to encode, e.g. the selected frames for each source file, is required. This CSV contains the location of the source files and descriptors such as which frames should be encoded, dimensions and frame rate of the input and encoded streams, and optional additional descriptors such as target bitrate per scene. An example of such a file is provided in FIG. 7.

In the example in FIG. 7, the S3videoPath indicates location of the source content from which the VISTA source, target and user validation clips will be created, srcWidth srcHeight are the dimensions of the source clip, width and height are the dimensions to encode the scene to, fps is the frame rate of the video, numFrames indicates how many frames should be encoded, starting from startOffset provided in format hh::mm:ss. Additional fields include the format of the video pixels in the source clip and encoded scenes and possible additional encoding parameters such as target bitrate for scene encoding.

Returning to block 530 in FIG. 5, using the prepared files and inputs described above, in one example embodiment of the discussed subject matter, an Auto-VISTA session is automatically created with the following steps. First a new Auto-VISTA session ID is created, and all required resources in the backend are allocated for the session. Then the user inputs are mapped to provide the full set of inputs and configurations required to automatically run the automated video encoding utility we developed. This utility receives as inputs JSON files describing the required run, and pointers to Docker images containing the binaries and environment on which to perform the run. It then launches an Amazon EC2 spot instance for each run, executes the run, and uploads results to the Amazon S3 bucket specified in the JSON file. Once scene creation is complete, pointers to all the video stream pairs and their accompanying metadata such as duration, resolution and difficulty level of the clip pair are stored in the VISTA backend DynamoDB.

We now turn to block 550 depicting automated crowd-sourced testing. A significant challenge in performing subjective quality evaluation to estimate the average user experience, is to get a good testing pool of 'average viewers'. This task is much more challenging than it seems, as some people have low sensitivity to video quality, while others, often considered 'Golden Eyes', are disturbed by even the slightest deterioration in video quality, which would go unnoticed by most viewers. To make matters worse, 'average viewers' who spend a significant amount of time performing video quality evaluation tasks, become more and more sensitive to artifacts and no longer reliably represent typical viewers. It therefore stands to reason that a crucial factor to receiving good results when using VISTA for subjective testing is the pool of users that perform the actual viewings. For large scale automated subjective testing we require access to a large, varied, and constantly changing set of potential testers. This falls directly into the scope of crowdsourcing marketplaces, which are targeted at enlisting the services of a large number of people, either paid or unpaid, typically via the Internet. Crowdsourcing marketplaces are considered by many a way to make humans and their computers an available, scalable, resource. A multitude of crowdsourcing platforms exist as their popularity continues to grow. One such platform is Amazon Mechanical Turk, or MTurk, which is very well suited for large-scale user testing tasks. The participants, termed 'Workers', receive a Human Intelligence Task or HIT, which in this case involves downloading the VISTA client and performing a test session, and are paid when the results are submitted. This provides an almost infinite resource of prospective viewers and enables fast turnaround at relatively low costs. It also enables very easy scaling of testing group size as desired for each round of testing.

Once the Auto-VISTA session creation is complete, the session can be started, or set as active. This will cause all VISTA clients starting the test process to receive test files belonging to this active session. In MTurk, this is done by creating a HIT consisting of instructions to download and run the VISTA client. Workers who then accept this HIT follow the instructions, and upon reaching the submit stage, receive a confirmation token from the VISTA backend. The users provide this confirmation token to get paid or for the task. It is also possible to automatically filter out users who did not correctly select the degraded clip in the user validation pairs, thus guaranteeing that the human performing the test actually payed attention when watching the videos, and did not just randomly press the buttons to complete the test as quickly as possible.

When it is determined that enough test results have been gathered, block 570 is activated. Note that it is also possible to activate this block periodically and obtain intermediate results and use these to determine when enough results have been collected. In 570 the test reports are retrieved from the backend. These reports contain all the information on each clip in each testing session. An example of a result set example is provided in FIG. 8. The Video ID is an internal label associated with the clip pair, Original and Degraded are paths to the file locations on Amazon S3, Difficulty is as explained above, #Plays indicates how many times the user viewed the clip pair, X0 Y0 and X1 Y1 are the displayed cropped frame upper left and lower right coordinates respectively, Width and Height are the full clip dimensions, Duration is the clip length in milliseconds. Target on describes on which side clip "B" was presented, and Selected is the side the user selected as having lower quality. User provides the user ID.

In one example embodiment, at least some of the analysis of the test results may be performed within the server 110. In other embodiments this analysis is done externally, entirely in block 570. The analysis may be done using some automated tool, for example implemented by way of Python scripts. Results from all the test sets performed are collected and tests from non-valid users—for example users who made the incorrect selection in the user-validation pairs, may be discarded or filtered out. The analysis unit then analyzes the results for the valid pairs—target pairs viewed by valid users, and calculates the statistical distribution of the user selections—as to which clip was has lower quality in each pair, and may also calculate the distribution of selections overall for all the evaluated A/B comparisons. This leads directly to the 'answer' depicted in block 590. For example, if statistical analysis shows that 90% of A/B pair comparisons performed by valid users resulted in a selection of the clip belonging to set A as having lower quality, then it can be assumed with a high level of certainty that set A does indeed have lower perceptual quality than the corresponding clips in set B. Statistics of the results per each viewer or user can also be obtained, for example to be able to divide users into groups with varying levels of sensitivity to video distortion to be used in future testing rounds.

Block 590 represents the answer or the output of the system in the example embodiment of FIG. 5. Once results are collected and analyzed, preferably using an automated analysis unit, the answer to the initial question is immediate. For the question "is B perceptually identical to A", the answer is "yes" if the percentage of selecting B as lower quality is close enough to 50%, with the distance from 50% which is acceptable. Determining what "close enough" is, can possibly be derived from the statistics of the pairs used for statistical significance, and possibly can be calculated using other statistics based tools or methodologies. For the question "is B superior compared to A", the answer is "yes" if A was selected as lower quality in more than 50% of the cases, with the certainty of that answer possibly depending on the distance from 50% compared to the deviation from 50% of the files used for statistical purposes, or possibly using other statistical analysis tools.

Figure 9:
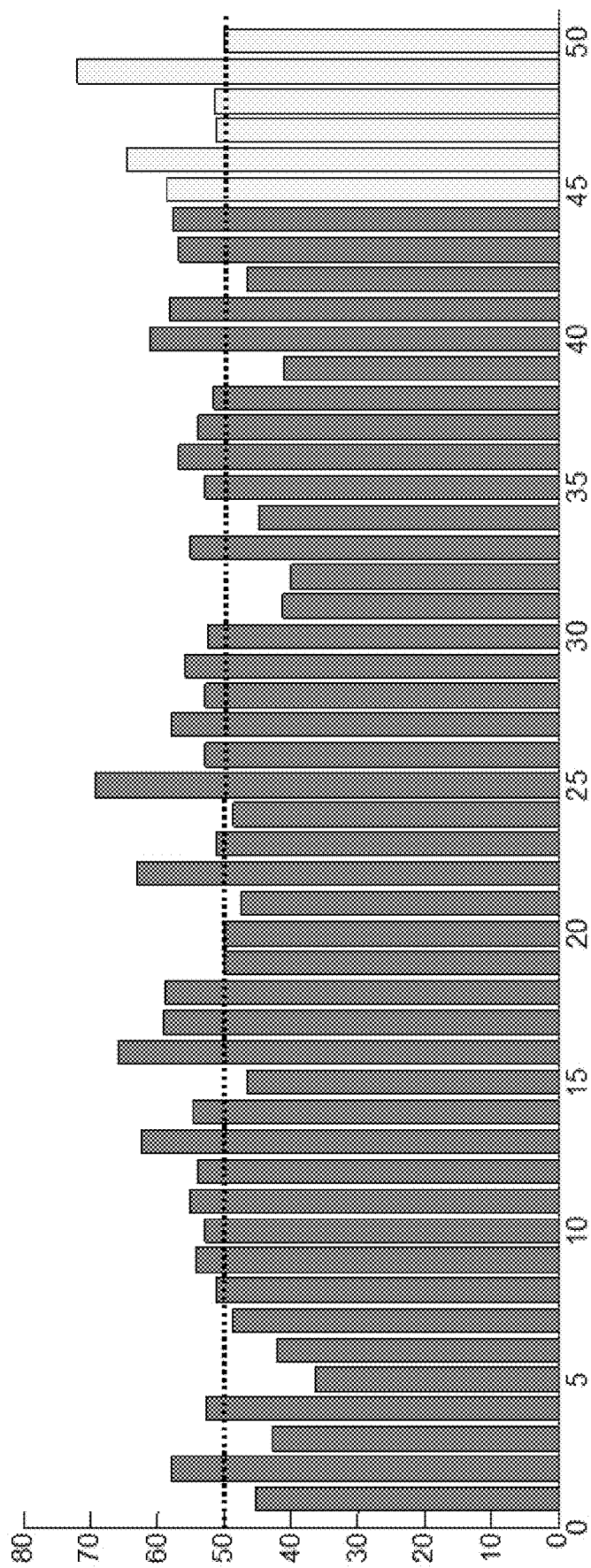
FIG. 9 illustrates an example of distribution of subjective quality results for a set of video pairs, obtained in accordance with certain embodiments of the presently disclosed subject matter.

Turning now to FIG. 9 there is illustrated an example of the statistical distribution of subjective quality results for a set of video pairs, obtained in accordance with certain embodiments of the presently disclosed subject matter. Percentage of views where 'target' clip was selected as lower quality per clip pair, shown for pairs with difficulty 5—depicted as blue (dark) bars, and difficulty 10—depicted as green (light) bars. As can be seen, the distribution is close to 50:50 and further analysis of the obtained results for this example showed that the two video sets being compared were indeed perceptually identical with a confidence level within the 95$^{th}$ percentile.

Thus configured, these teachings provide for video quality assessment such that reliable information regarding perceived subjective quality of a set of video clips, or comparative perceived subjective quality of pairs of video clips, can be obtained in a fast, scalable and cheap procedure.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

It is to be noted that the examples and embodiments described herein are illustrated as non-limiting examples and should not be construed to limit the presently disclosed subject matter in any way.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable storage medium tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A computerized system for video quality assessment, the system comprising:
    a server comprising a database and a processor operatively connected thereto, wherein:
    the database is configured to store pointers to a plurality of video clip pairs to be used in one or more test sessions performed by one or more users, each video clip pair including a target video clip and a reference video clip corresponding thereto; and
    the processor is configured to:
    create, for each test session performed by a respective user, a test set including a set of video clip pairs selected from the plurality of video clip pairs to be displayed to the respective user, a display order of the video clip pairs in the set and display positions of the target video clip and the reference video clip in each video clip pair on a display screen of the respective user, giving rise to one or more test sets corresponding to the one or more test sessions;
    send the one or more test sets to the one or more users for assessing quality of the target video clip and the reference video clip in each video clip pair in one or more sets of video clip pairs in the one or more test sets; and
    receive feedback regarding the assessed quality from the one or more users, wherein the feedback is usable for providing subjective quality evaluation of the plurality of video clip pairs,
    wherein said set of video clip pairs include one or more video clip pairs each with visible degradation in quality between the target video clip and the corresponding reference video clip, wherein the one or more video clip pairs are used for user validation, and
    wherein the display order of the video clip pairs in the set is determined at least by inserting the one or more video clip pairs with visible degradation in one or more semi-randomized slots along the test set.

2. The computerized system according to claim 1, further comprising a client unit operatively connected to the server, the client unit comprising an additional processor configured to perform a given test session by a given user:
    receive said test set; and
    display the video clip pairs in the set according to the display order and the display positions in the test set, thereby enabling the given user to perform the given test session and assess quality of the target video clip and reference video clip in each video clip pair; and collect feedback regarding the assessed quality for each video clip pair and send the feedback to said server, wherein the feedback is usable for providing subjective quality evaluation of the plurality of video clip pairs.

3. The computerized system according to claim 1, wherein said set of video clip pairs include one or more video clip pairs used for statistical validation, wherein the target video clip and the reference video clip in each of the one or more video clip pairs are identical.

4. The computerized system according to claim 1, wherein said processor is further configured to select the set of video clips pairs from said database for each test set, so that each of the plurality of video clip pairs is included in a pre-determined number of the one or more test sets.

5. The computerized system according to claim 1, wherein the display positions of the target video clip and the reference video clip in each video clip pair are determined in a semi-randomized manner.

6. The computerized system according to claim 1, wherein the display order of the video clip pairs in the set is determined in a semi-randomized manner.

7. A computerized system for video quality assessment, the system comprising a processor configured to:

receive a test set including a set of video clip pairs selected from a plurality of video clip pairs to be displayed to a user, each video clip pair including a target video clip and a reference video clip, a display order of the video clip pairs in the set, and display positions of the target video clip and the reference video clip in each video clip pair on a display screen of the user;

display the video clip pairs in the set according to the display order and the display positions in the test set, thereby enabling the user to perform a test session and assess quality of the target video clip and the reference video clip in each video clip pair; and collect feedback regarding the assessed quality for each video clip pair and send the feedback to a server, wherein the feedback is usable for providing subjective quality evaluation of the plurality of video clip pairs, wherein said set of video clip pairs include one or more video clip pairs each with visible degradation in quality between the target video clip and the corresponding reference video clip, wherein the one or more video clip pairs are used for user validation, and wherein the display order of the video clip pairs in the set is determined at least by inserting the one or more video clip pairs with visible degradation in one or more semi-randomized slots along the test set.

8. The computerized system according to claim 7, wherein said processor comprises a client application configured to perform said receiving, displaying, collecting and sending in a fully automated manner.

9. A computerized method for video quality assessment, the method comprising:

generating, by a processor in a server, one or more test sets corresponding to one or more test sessions performed by one or more users, comprising:

creating, for each test session performed by a respective user, a test set including a set of video clip pairs selected from a plurality of video clip pairs stored in a database to be displayed to the respective user, a display order of the video clip pairs in the set and display positions of a target video clip and a corresponding reference video clip included in each video clip pair on a display screen of the respective user, giving rise to the one or more test sets corresponding to the one or more test sessions;

sending, by the processor, the one or more test sets to the one or more users for assessing quality of the target video clip and the reference video clip in each video clip pair in one or more sets of video clip pairs in the one or more test sets; and receiving, by the processor, feedback regarding the assessed quality from the one or more users, wherein the feedback is usable for providing subjective quality evaluation of the plurality of video clip pairs, wherein said set of video clip pairs include one or more video clip pairs each with visible degradation in quality between the target video clip and the corresponding reference video clip, wherein the one or more video clip pairs are used for user validation, and wherein the display order of the video clip pairs in the set is determined at least by inserting the one or more video clip pairs with visible degradation in one or more semi-randomized slots along the test set.

10. The computerized method according to claim 9, further comprising performing a given test session by an additional processor in a client unit operatively connected to the server, comprising:

receiving said test set from the server;

displaying the video clip pairs in the set according to the display order and the display positions in the test set, thereby enabling a given user to perform the given test session and assess quality of the target video clip and reference video clip in each video clip pair; and collecting feedback regarding the assessed quality for each video clip pair and sending the feedback to said server, wherein the feedback is usable for providing subjective quality evaluation of the plurality of video clip pairs.

11. The computerized method according to claim 9, wherein said set of video clip pairs include one or more video clip pairs used for statistical validation, wherein the target video clip and the reference video clip in each of the one or more video clip pairs are identical.

12. The computerized method according to claim 9, further comprising selecting the set of video clips pairs from said database for each test set, so that each of the plurality of video clip pairs is included in a pre-determined number of the one or more test sets.

13. The computerized method according to claim 9, wherein the display positions of the target video clip and the reference video clip in each video clip pair are determined in a semi-randomized manner.

14. The computerized method according to claim 9, wherein the display order of the video clip pairs in the set is determined in a semi-randomized manner.

15. A computerized method for video quality assessment, the method comprising:

receiving, by a processor, a test set including a set of video clip pairs selected from a plurality of video clip pairs to be displayed to a user, each video clip pair including a target video clip and a reference video clip, a display order of the video clip pairs in the set, and display positions of the target video clip and the reference video clip in each video clip pair on a display screen of the user;

displaying, by the processor, the video clip pairs in the set according to the display order and the display positions in the test set, thereby enabling the user to perform a test session and assess quality of the target video clip and the reference video clip in each video clip pair; and collecting, by the processor, feedback regarding the assessed quality for each video clip pair and sending the feedback to a server, wherein the feedback is usable for providing subjective quality evaluation of the plurality of video clip pairs, wherein said set of video clip pairs include one or more video clip pairs each with visible degradation in quality between the target video clip and the corresponding reference video clip, wherein the one or more video clip pairs are used for user validation, and wherein the display order of the video clip pairs in the set is determined at least by inserting the one or more video clip pairs with visible degradation in one or more semi-randomized slots along the test set.

16. The computerized method according to claim 15, wherein said receiving, displaying, collecting and sending are performed in a fully automated manner.

17. A non-transitory computer readable storage medium tangibly embodying a program of instructions that, when executed by a computer, cause the computer to perform a method of video quality assessment, the method comprising:

receive a test set including a set of video clip pairs selected from a plurality of video clip pairs to be displayed to a user, each video clip pair including a target video clip and a reference video clip, a display order of the video clip pairs in the set, and display positions of the target video clip and the reference video clip in each video clip pair on a display screen of the user;

display the video clip pairs in the set according to the display order and the display positions in the test set, thereby enabling the user to perform a test session and assess quality of the target video clip and the reference video clip in each video clip pair; and collect feedback regarding the assessed quality for each video dip pair and sending the feedback to a server, wherein the feedback is usable for providing subjective quality evaluation of the plurality of video clip pairs, wherein said set of video clip pairs include one or more video clip pairs each with visible degradation in quality between the target video clip and the corresponding reference video clip, wherein the one or more video clip pairs are used for user validation, and wherein the display order of the video clip pairs in the set is determined at least by inserting the one or more video clip pairs with visible degradation in one or more semi-randomized slots along the test set.

* * * * *